United States Patent [19]

Rudd et al.

[11] 4,219,722
[45] Aug. 26, 1980

[54] METHODS AND APPARATUS FOR HEATING METAL PARTS WITH MAGNETICALLY DRIVEN TRAVELLING ELECTRIC ARC

[75] Inventors: Wallace C. Rudd, New Canaan; Humfrey N. Udall, Darien, both of Conn.

[73] Assignee: Thermatool Corp., Stamford, Conn.

[21] Appl. No.: 861,703

[22] Filed: Dec. 19, 1977

[51] Int. Cl.² .............................................. B23K 9/08
[52] U.S. Cl. .................................... 219/123; 219/61; 219/122; 219/136
[58] Field of Search ................ 219/137 R, 61, 123, 219/136, 122

[56] References Cited
U.S. PATENT DOCUMENTS

| 483,425 | 9/1892 | Coffin | 219/137 R |
| 1,512,787 | 10/1924 | Morton | 219/137 R |
| 1,544,044 | 6/1925 | Smith | 219/123 |

Primary Examiner—E. A. Goldberg
Attorney, Agent, or Firm—Brooks, Haidt, Haffner & Delahunty

[57] ABSTRACT

Methods and apparatus for the welding and heat treating of metal parts in which an electric arc extends between a pair of adjacent metal parts or between an electrode and one or more metal parts with the arc traversing the metal part or parts a plurality of times during the heating cycle. For finite length metal parts, i.e. when the surface or surfaces to be heated do not provide closed paths to be followed by the arc, the arc is initiated, caused to follow the surface, extinguished and then reinitiated, or is caused to traverse the surfaces in alternately opposite directions after initiation. With finite length metal parts, run-off tabs are provided at the ends of the surfaces to prevent overheating at such ends. A magnetic field causes the arc to traverse the surfaces and may be modified in strength or distribution to vary traverse rate. Also, by varying the magnetic field path, by superimposing another magnetic field or by gas pressure, the arc may be caused to follow paths which traverse entire surfaces even though arc cross-section is less than the width of surfaces. The arc may be direct or alternating current and the magnetic field may be constant or variable in both magnitude and polarity. Sensors responsive to arc position may be used to control reversal of direction of arc movement, arc speed, magnetic field, etc.

59 Claims, 64 Drawing Figures

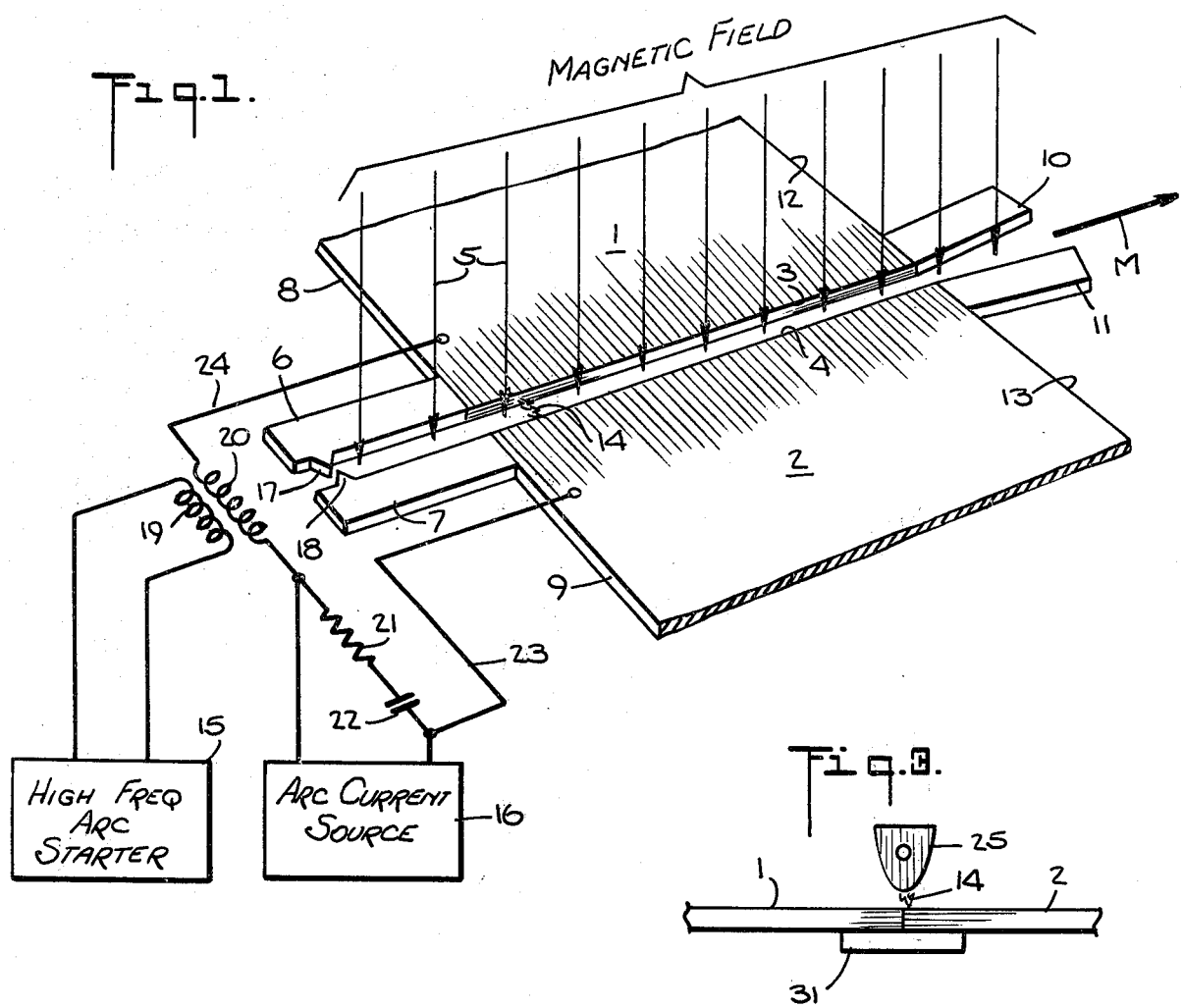
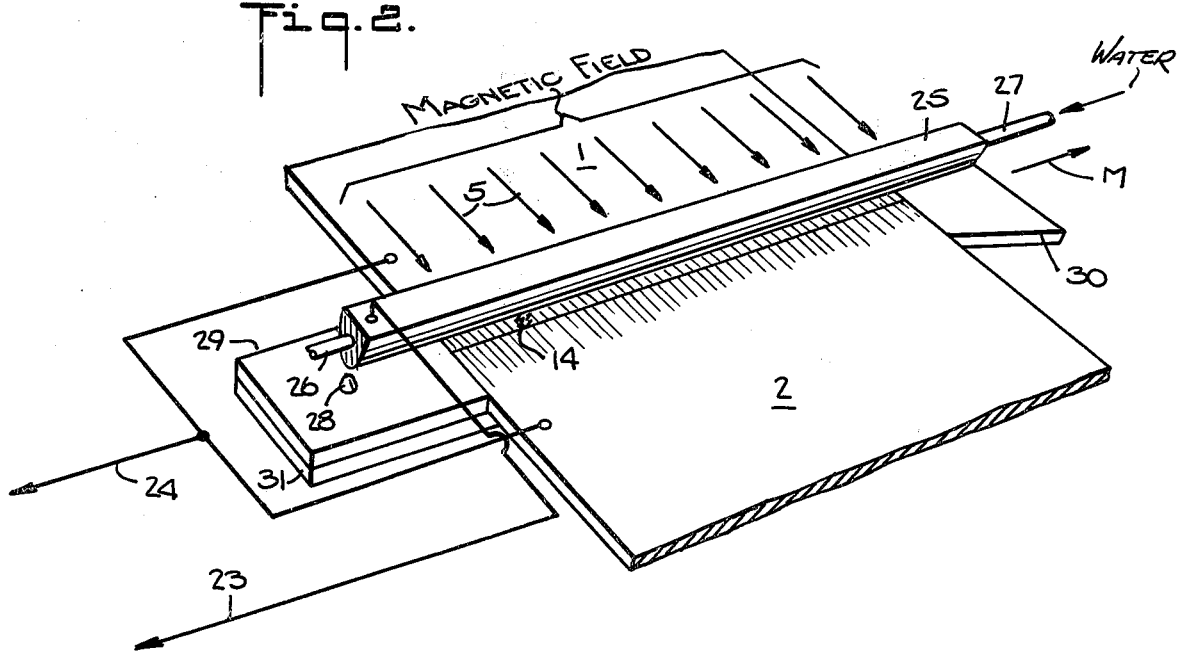

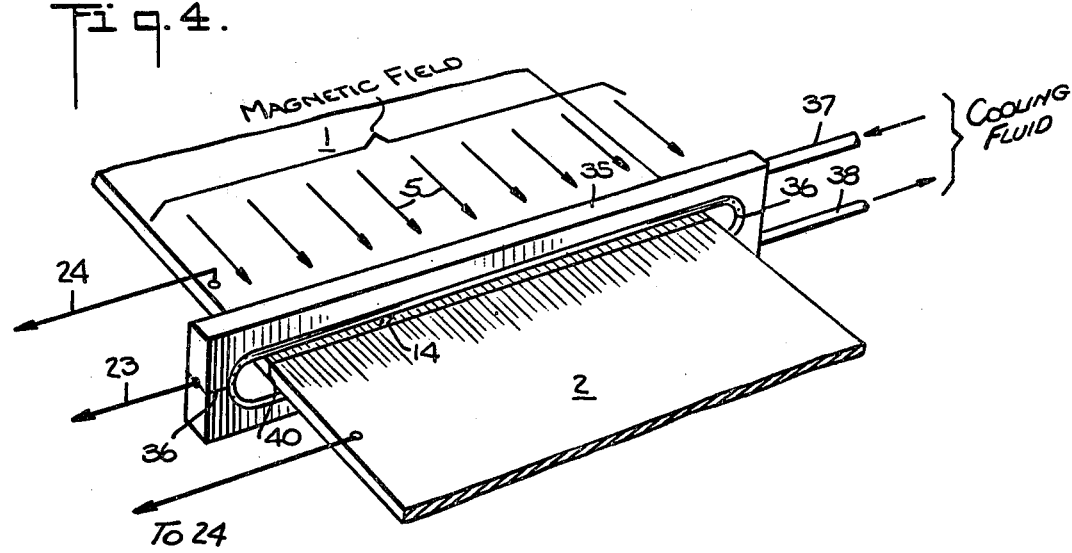
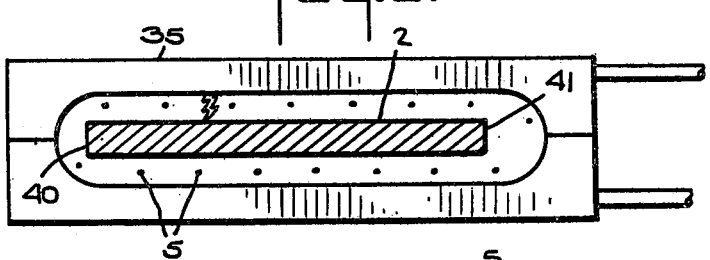
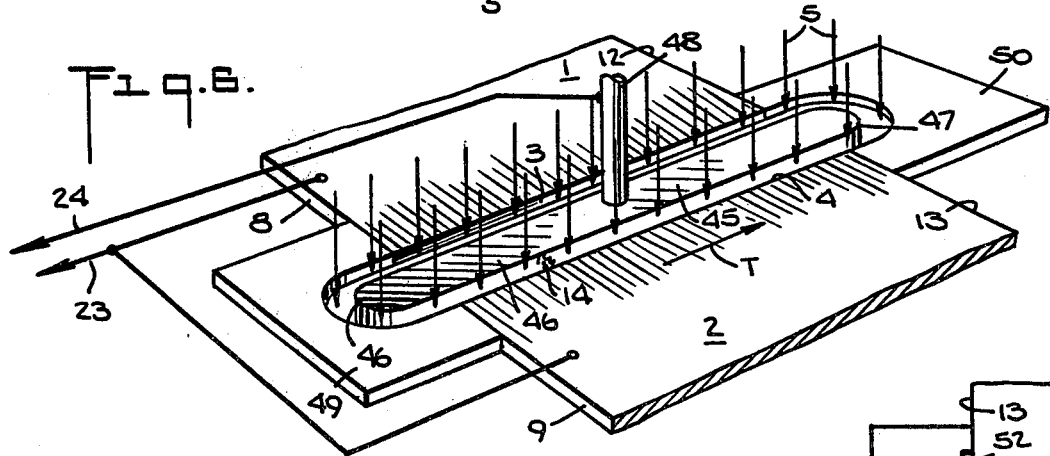
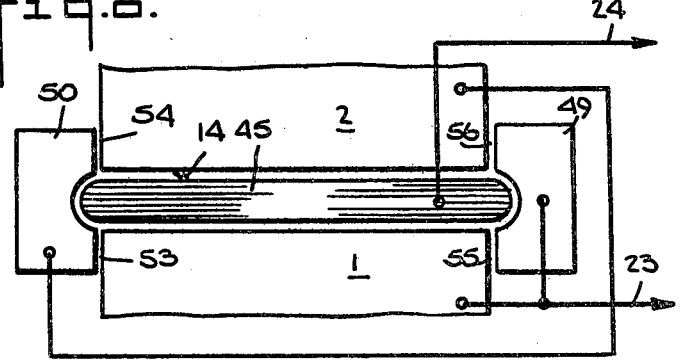
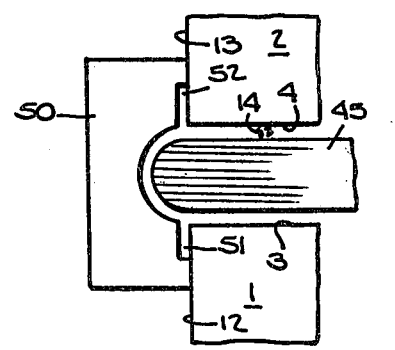

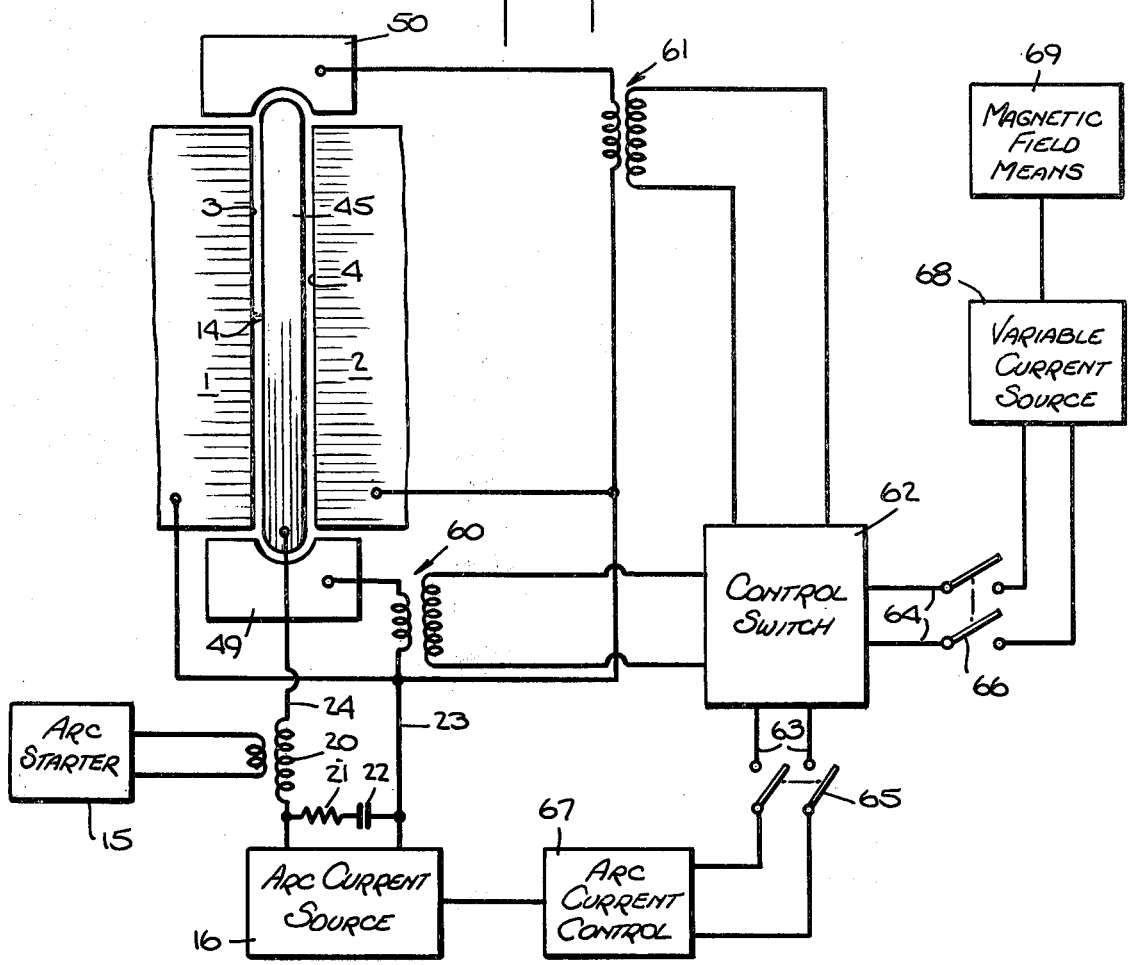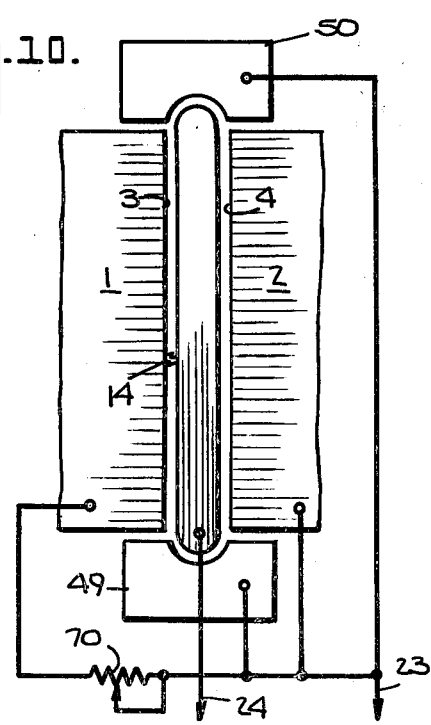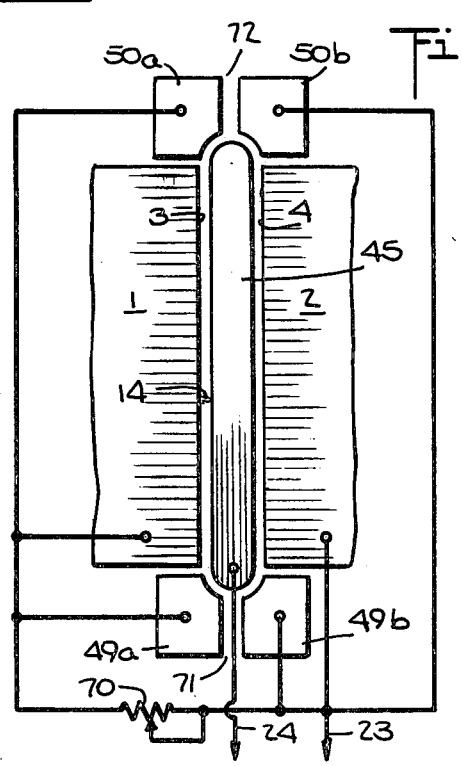

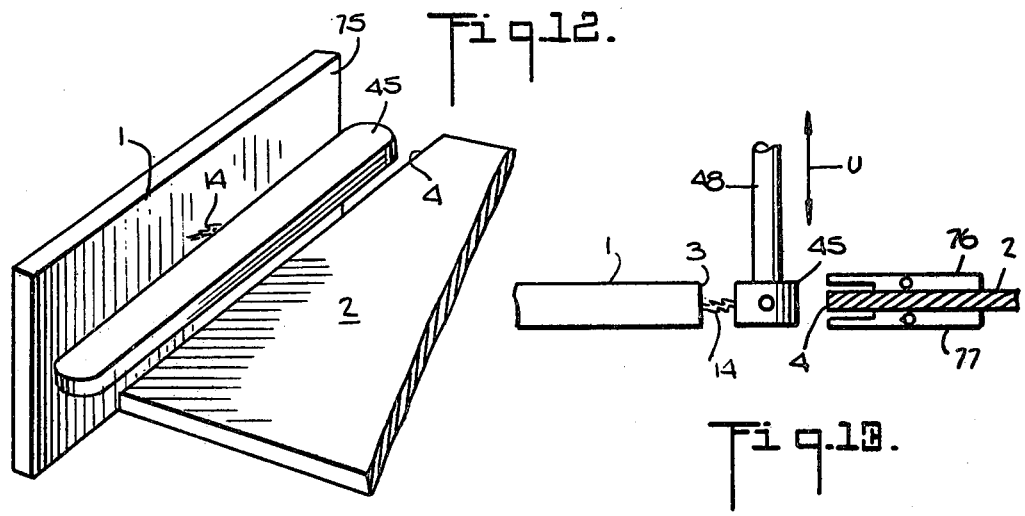
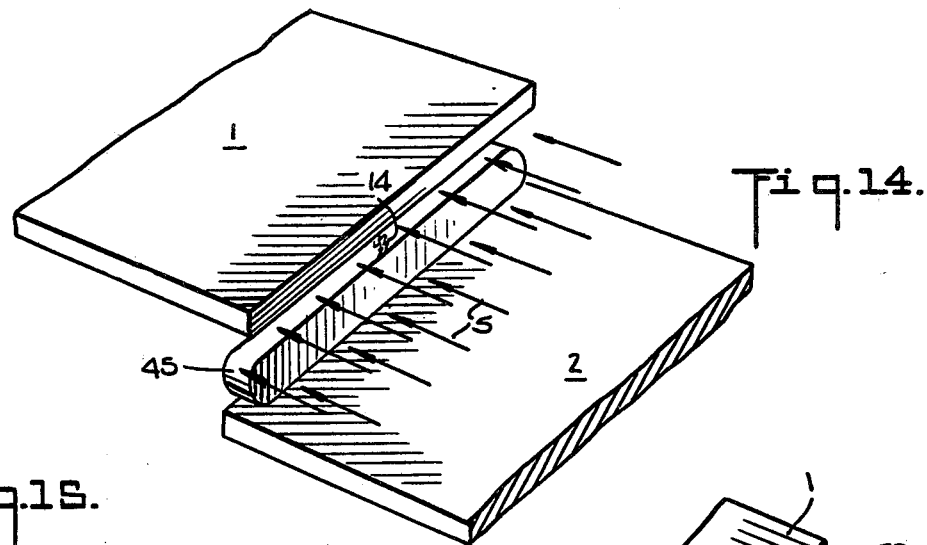
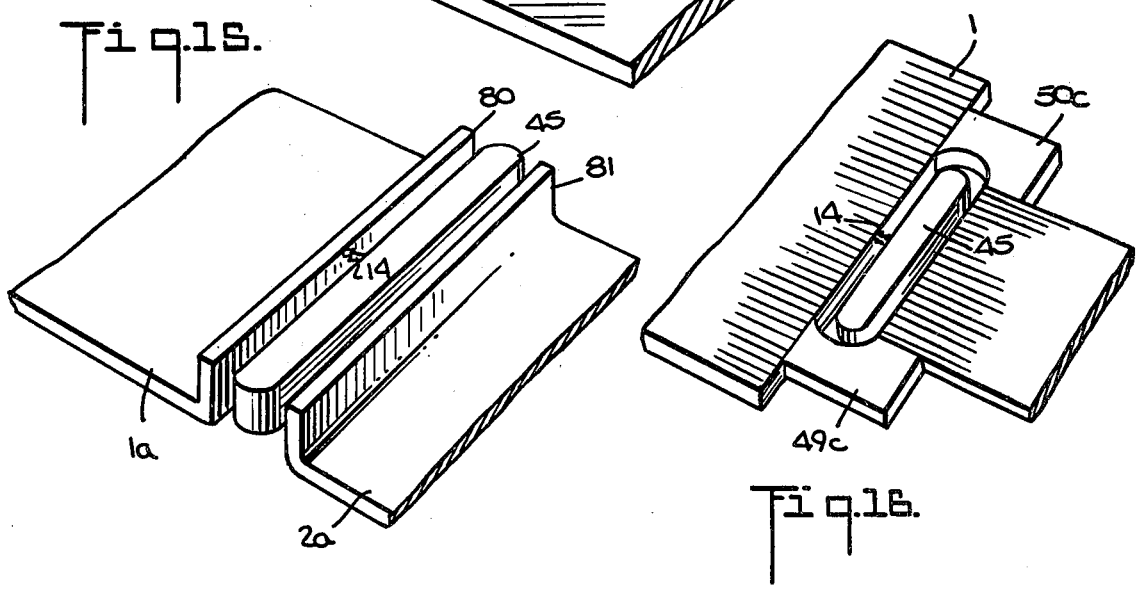

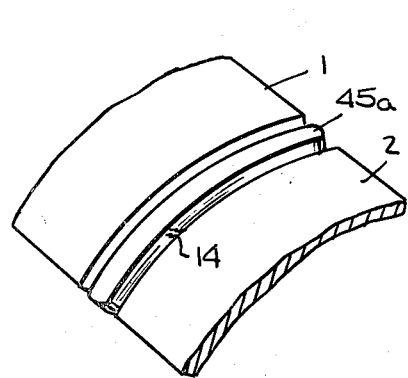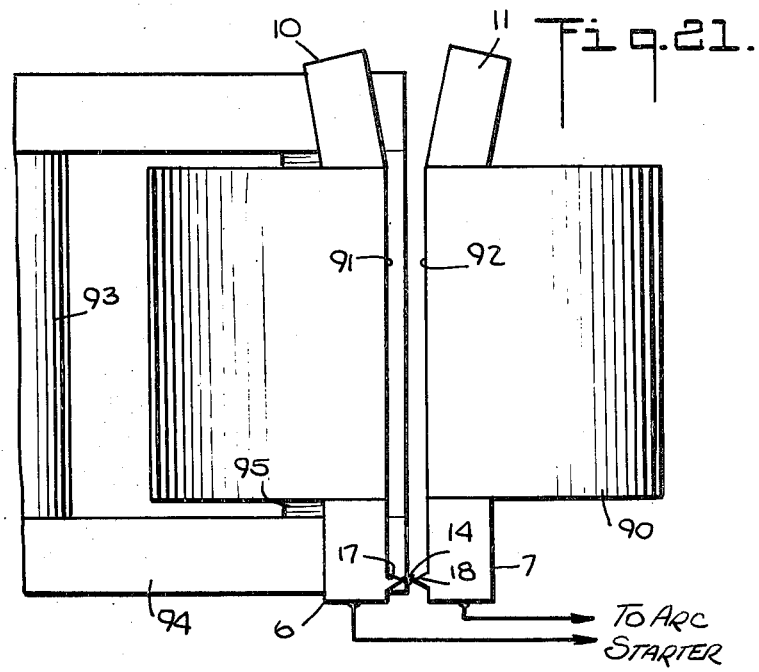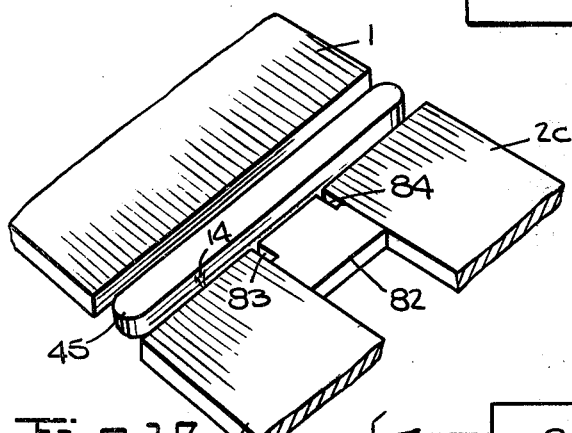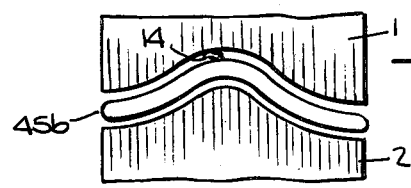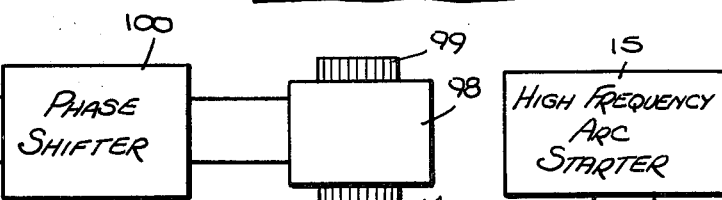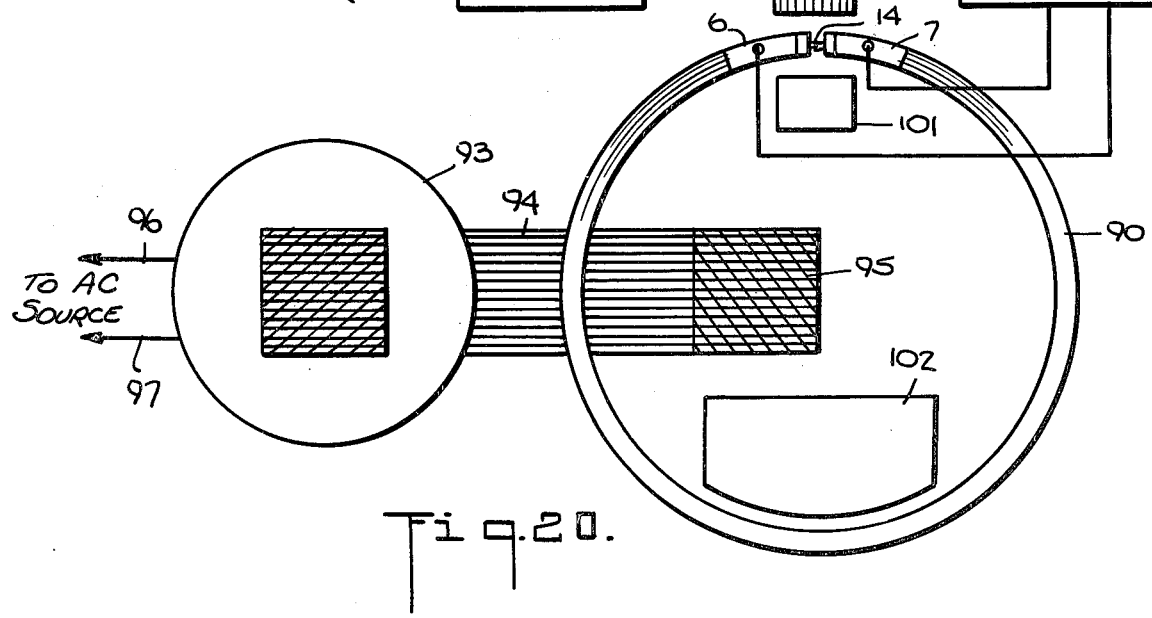

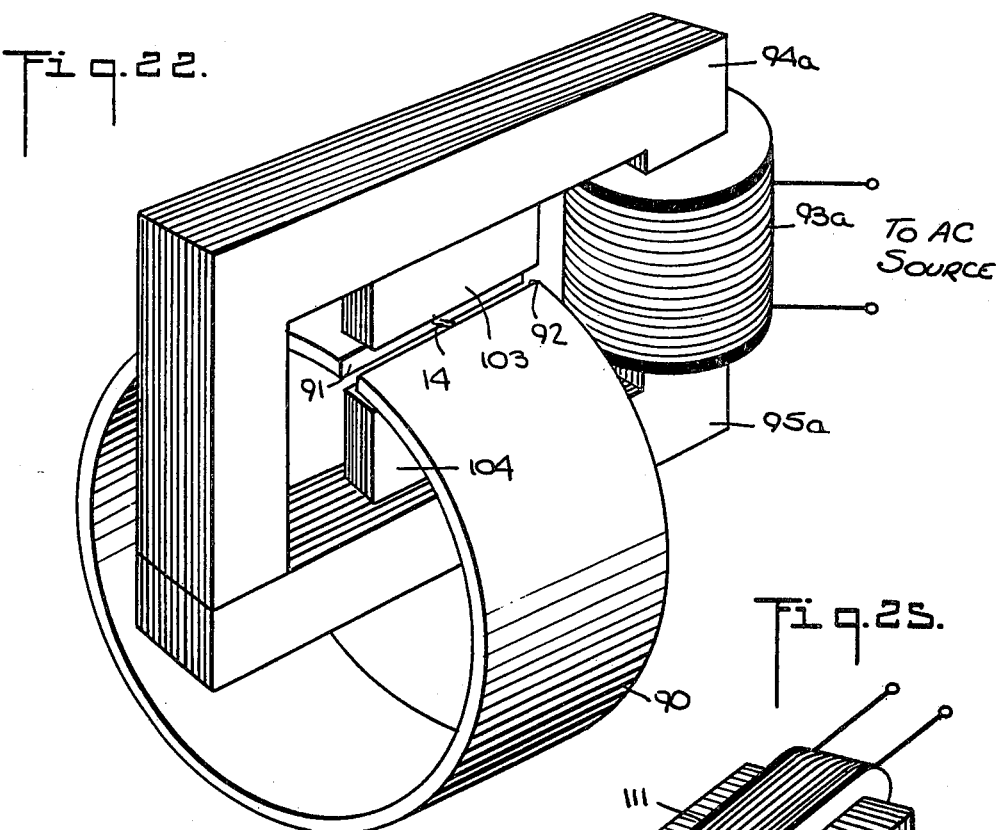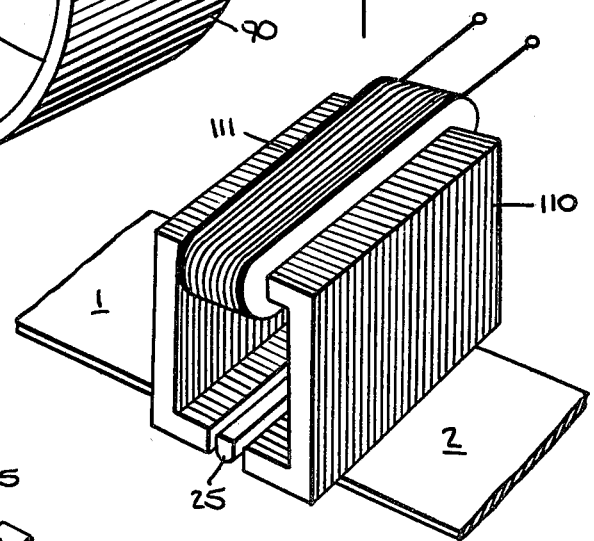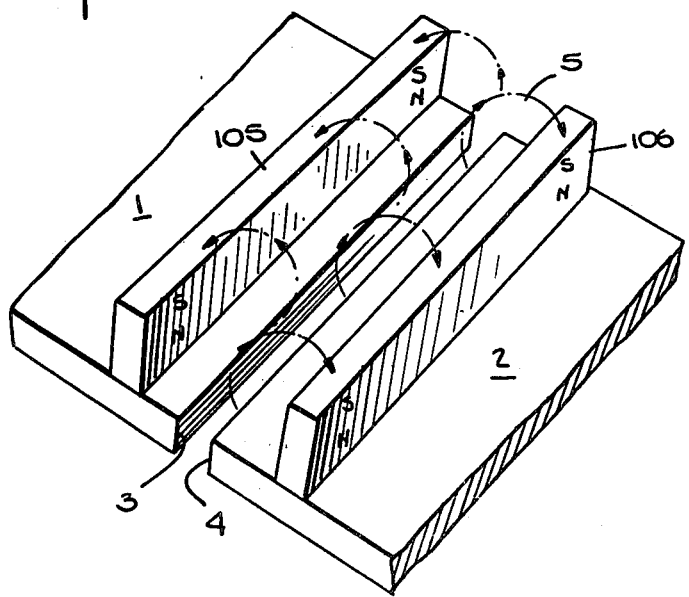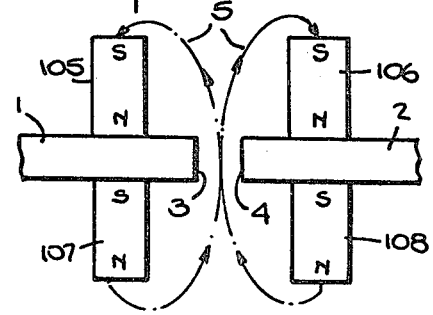

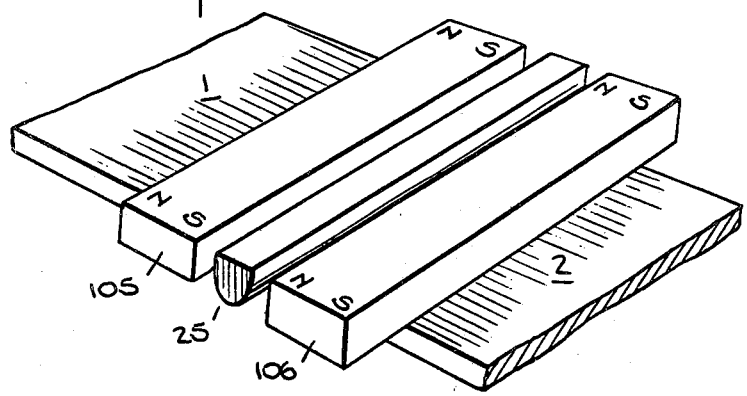
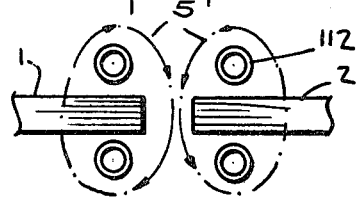
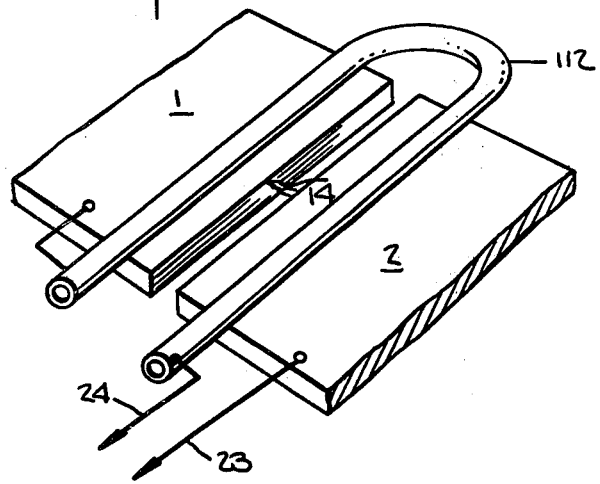
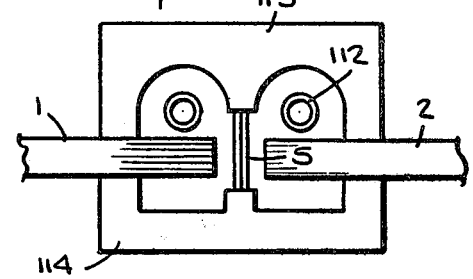
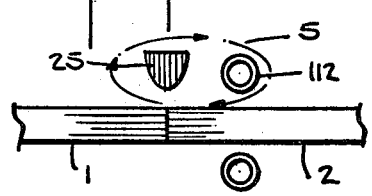
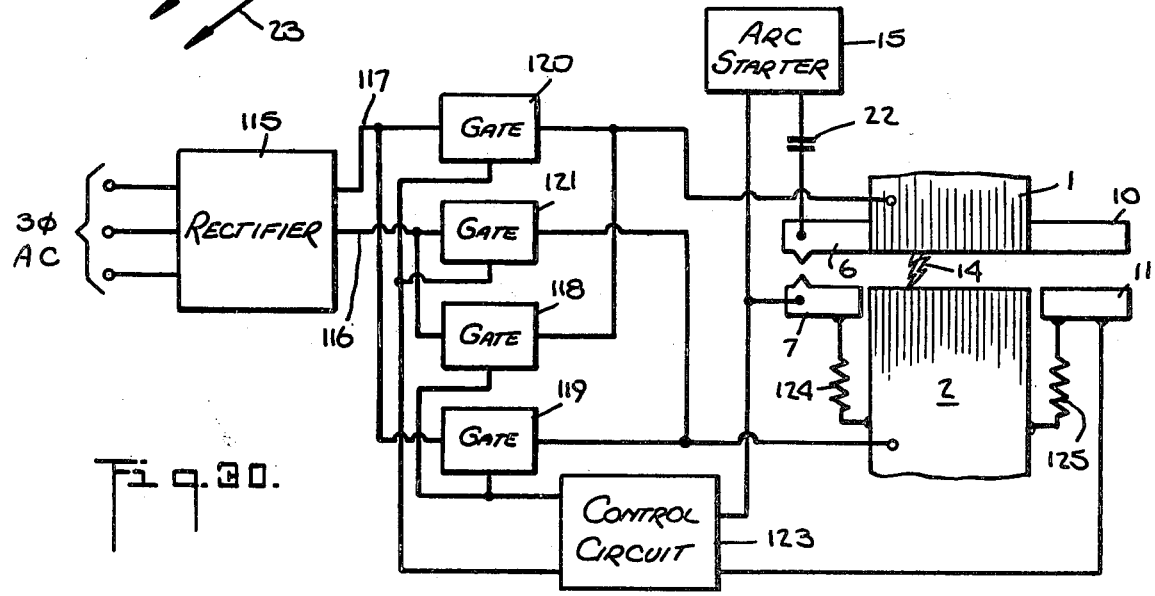

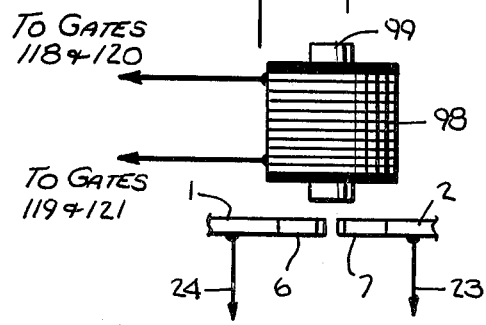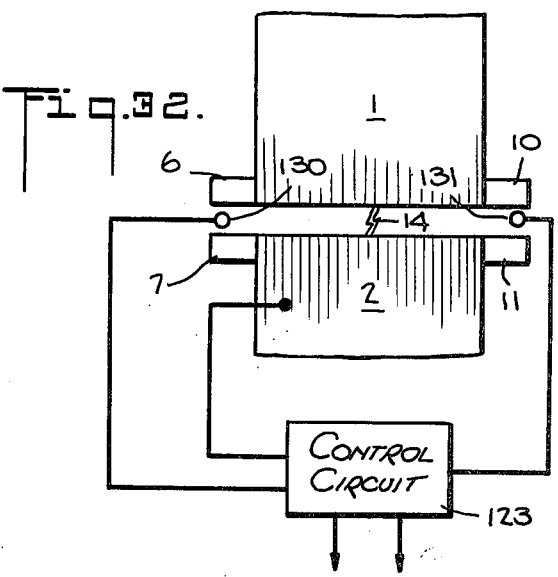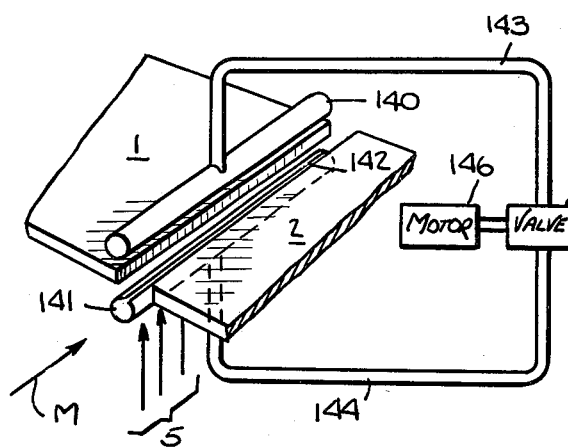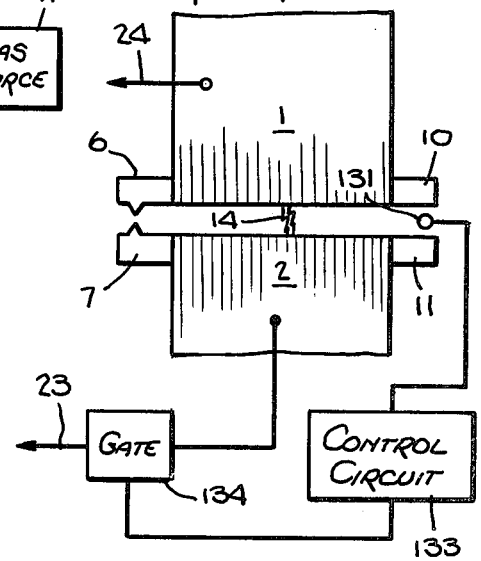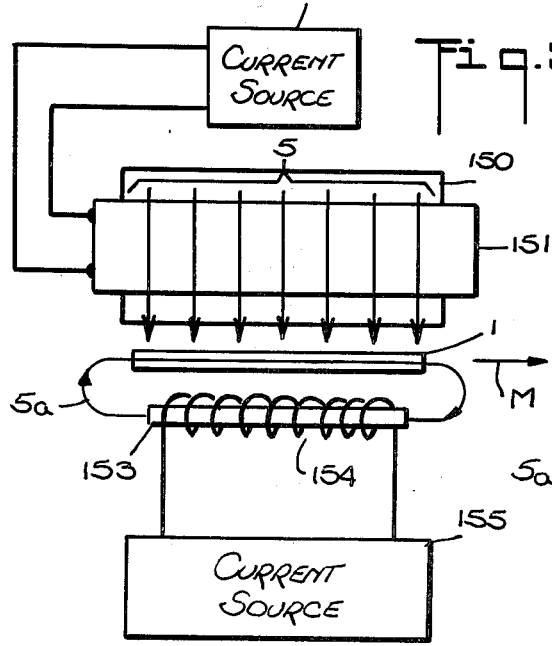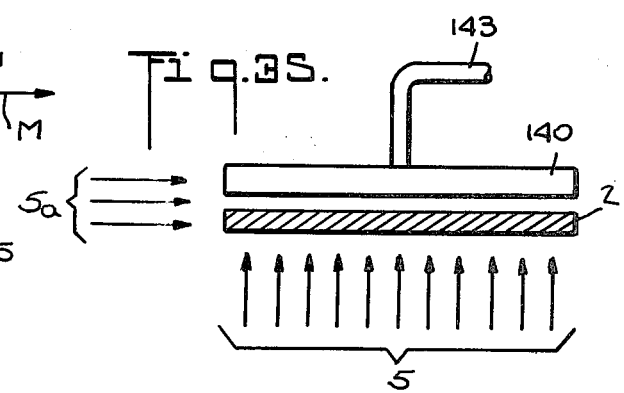

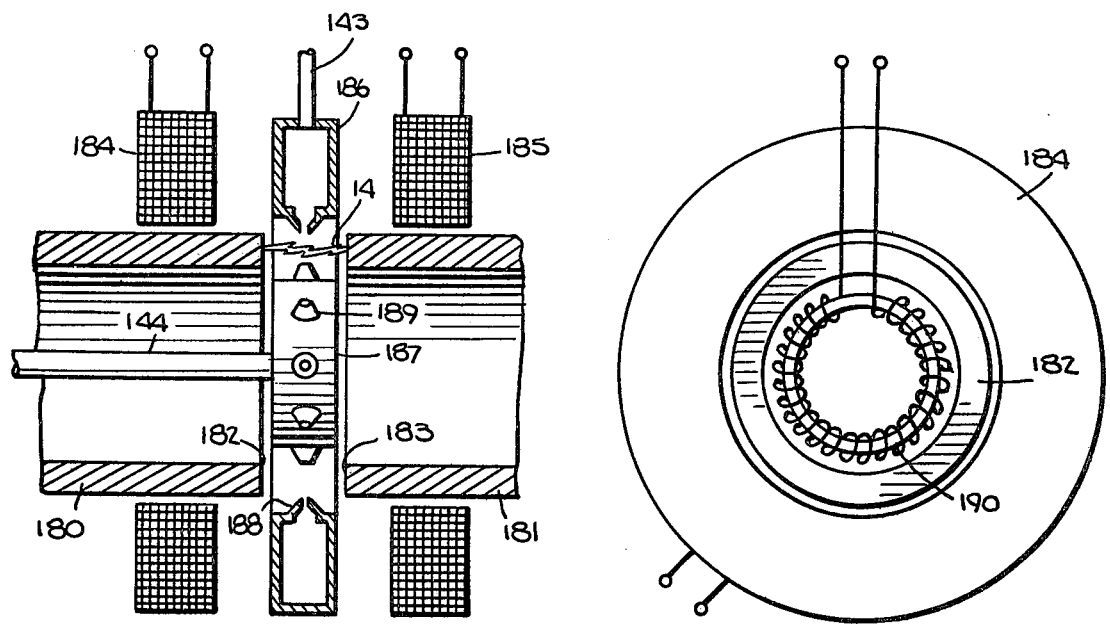
Fig.45.
Fig.46.
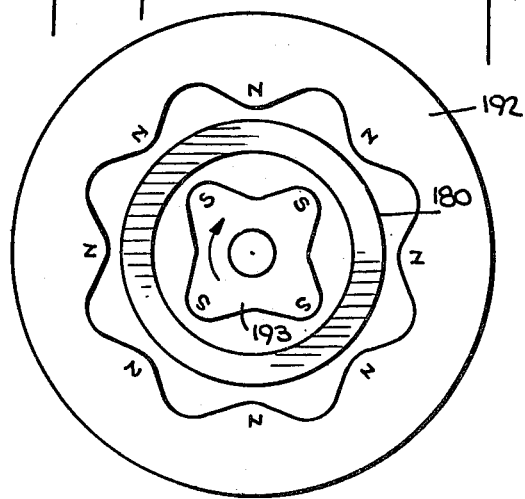
Fig.48.
Fig.47.
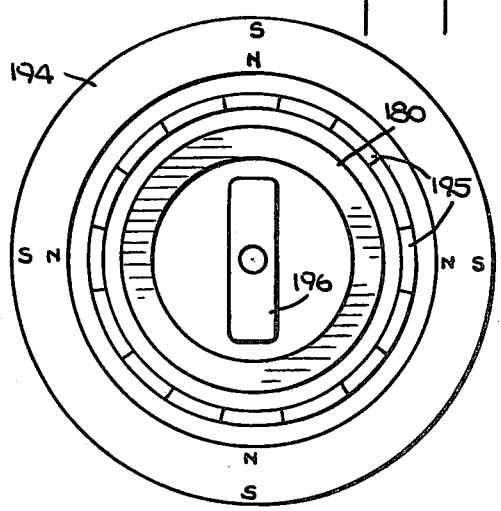
Fig.49

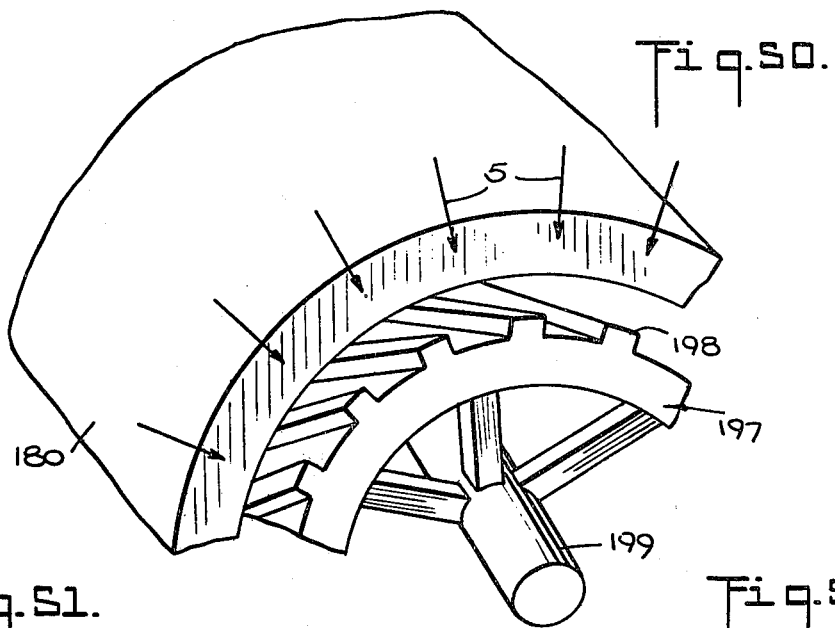
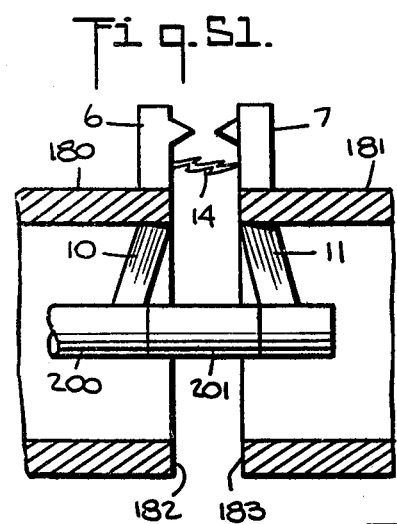
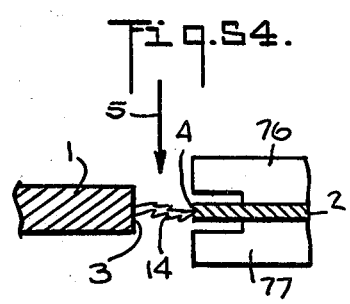
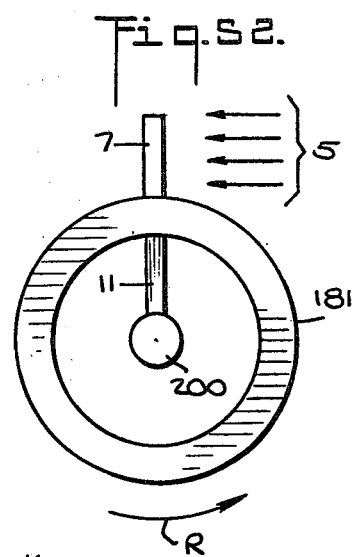
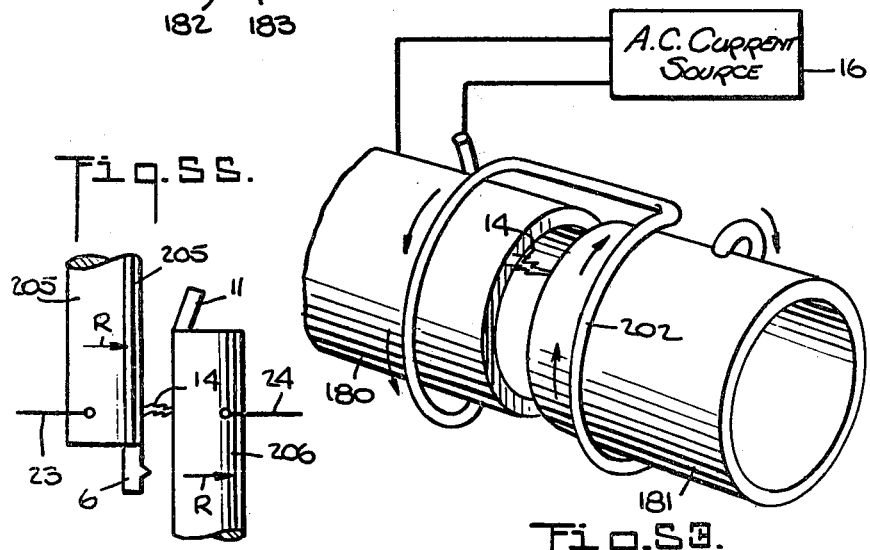

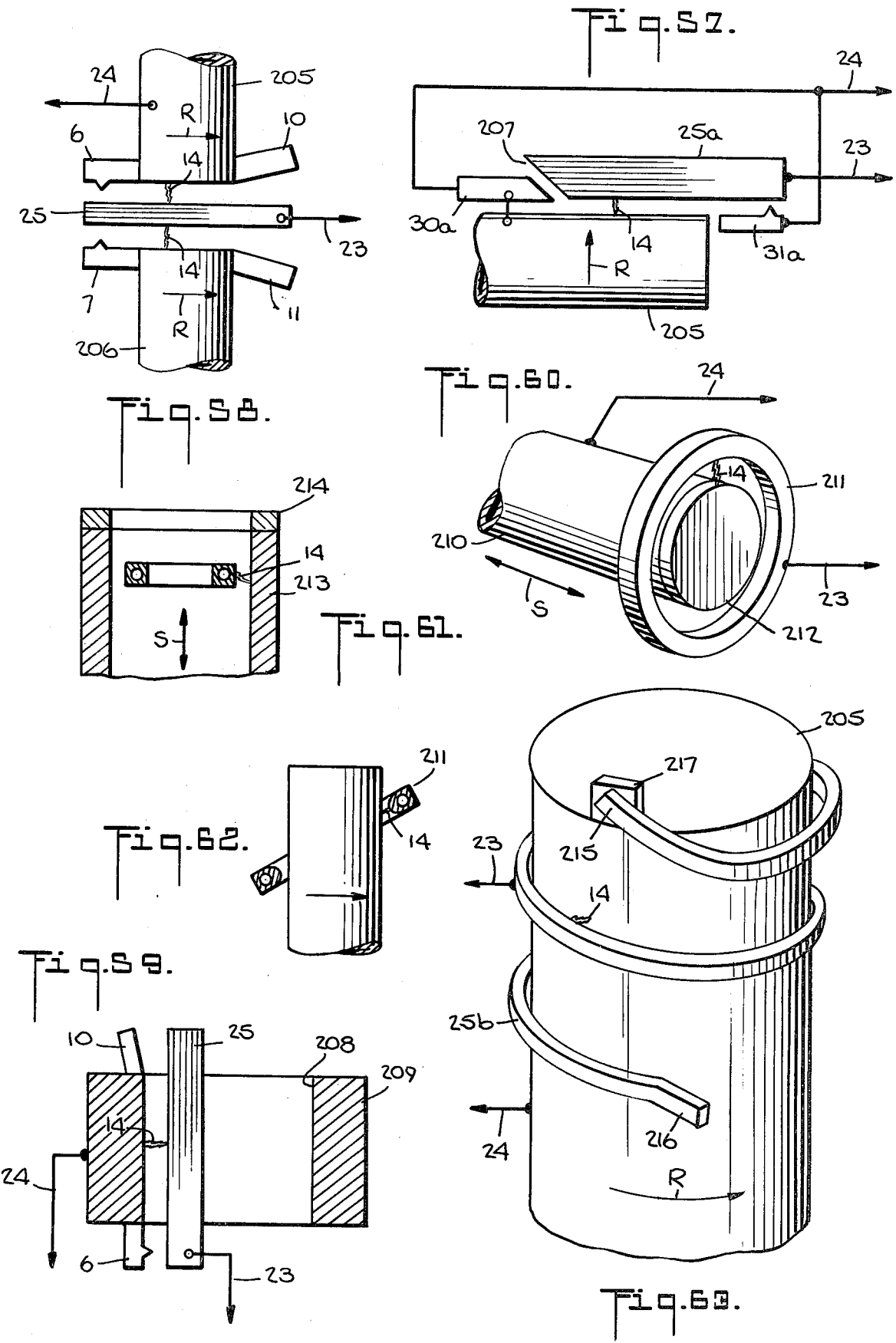

METHODS AND APPARATUS FOR HEATING METAL PARTS WITH MAGNETICALLY DRIVEN TRAVELLING ELECTRIC ARC

This invention relates to the welding together and to heat treatment of metal parts by subjecting the parts to the heating produced by means of an electric arc extending between the parts or from an electrode to one or more parts and moved along the parts by a magnetic field.

Such heating of parts by an electric arc is well-known in the art. One of the earliest patents is U.S. Pat. No. 510,777, illustrating an arc between an electrode and a metal part which is moved in a circular path by a magnetic field. Later patents include U.S. Pat. Nos. 2,286,210; 2,286,211 and 2,286,212 relating to heating the ends of a pair of pipes by an arc therebetween which is moved around the axis of the pipes by a magnetic field, U.S. Pat. Nos. 2,809,277 and 2,809,278 relating to heating rectilinear edges of cans by magnetically moving an arc between an electrode and the edges along the edges and several other later patents involving mainly an arc which is continuous during the heating time and which is moved in a continuous, circular path.

There are numerous problems involved in such heating which have not been solved prior to this invention. For example, it usually is not possible to bring a metal part up to the desired temperature, e.g., for welding thereof, with a single pass of the arc along the surface of the part, because of the magnitude of the current involved and/or the fact that any hesitation in the movement of the arc with currents of the magnitude required will cause uneven heating of, or burned out portions in, the metal part, or because the use of slow arc movement permits the portion initially heated to cool before the last portion is heated to the desired temperature. In this connection, it is known that it is difficult to control the movement of the arc because it "hangs up" on craters and burrs and for other not readily understood reasons. In addition, if the part being heated is wider than the cross-section of the arc impinging thereon, the arc may or may not follow the desired path, that is, it can "wander" from the desired path. Accordingly, most of the heating which has been commercially successful has been limited to the use of smaller magnitude currents and several passes of the arc along circular surfaces to be heated.

However, although several passes along closed, continuous paths, such as between the ends of pipes, are readily carried out because the arc may be continuous, repeated passes of the arc along discontinuous paths causes problems. As used herein, the expression "a continuous arc" means one that is not interrupted long enough for de-ionization to occur and includes an arc energized from an alternating current source. Thus, when repeated passes along a discontinuous path are required, for example, to weld two plates together at their edges, it usually is desirable to cause the arc to traverse the path in the same direction (for uniformity of heating) during each pass, which means that the arc must be repeatedly extinguished at one end of the path and restruck at the beginning of the path. This causes further problems, particularly because it is difficult to extinguish a current of the magnitude desired with switches, and with extinguishing due only to the magnetic field and the arc voltage, the arc also tends to "dwell" or "hesitate" at the end where extinguishing occurs, thereby overheating the metal at the latter end. Because of the different heat conduction conditions at the metal ends, different heating thereof with respect to the remainder of the metal is a sufficient problem without the added problem of arc extinction.

When the arc is a direct current arc, there is the further problem that the part connected to the negative terminal of the source heats more than a part connected to the positive terminal, e.g., up to at least 20% more, which makes it difficult to obtain equal heating of the two parts when the arc extends between them. Also, whether the arc current is alternating or direct, uniform heating distribution on a surface of a part which is larger than the cross-section of the impinging arc is a further problem.

One object of the invention is to provide methods and apparatus for overcoming at least some of the problems described hereinbefore.

Another object of the invention is to provide improved methods and apparatus for uniformly heating surfaces which are larger than the cross-section of the arc impinging thereon.

A further object of the invention is to provide improved methods and apparatus for heating discontinuous surfaces with repeated passes of an electric arc.

Other objects and advantages of the present invention will be apparent to those skilled in the art from the following detailed description of the several embodiments thereof, which description should be considered in conjunction with the accompanying drawings in which:

FIG. 1 is a diagrammatic, perspective view of a preferred embodiment of the invention, in which an electric arc extends between the end surfaces of a pair of plates;

FIG. 2 is a diagrammatic, perspective view of an embodiment of the invention in which an electric arc extends between an electrode and the end portions of a pair of plates;

FIG. 3 is a fragmentary, side view of a portion of the embodiment shown in FIG. 2;

FIG. 4 is a diagrammatic, perspective view of a modification of the embodiment shown in FIGS. 2 and 3;

FIG. 5 is a fragmentary, end view of a portion of the embodiment shown in FIG. 4;

FIG. 6 is a diagrammatic, perspective view of a further embodiment of the invention;

FIG. 7 is a fragmentary, plan view of a modification of a portion of the embodiment shown in FIG. 6;

FIG. 8 is a plan view of a modification of a portion of the embodiment shown in FIG. 6;

FIG. 9 is a combined circuit diagram and a plan view of the embodiment shown in FIG. 8;

FIG. 10 is a combined circuit diagram and a plan view illustrating a modification of the embodiment shown in FIG. 9;

FIG. 11 is a combined circuit diagram and a plan view of a modification of the embodiment shown in FIG. 10;

FIG. 12 is a diagrammatic, perspective view showing a portion of the apparatus employed in simultaneous heating of the end of one plate and the side surface of another plate;

FIG. 13 is a diagrammatic, side view illustrating the use of the invention for simultaneous heating of the end of a relatively thin plate and the end of a relatively thick plate;

FIG. 14 is a diagrammatic, perspective view illustrating the use of the invention in connection with the production of a lap weld between a pair of plates;

FIG. 15 is a diagrammatic, perspective view illustrating the application of the invention for the simultaneous heating of flanges at the ends of a pair of plates;

FIG. 16 is a diagrammatic, perspective view illustrating the application of the invention for the simultaneous heating of the end of a narrow plate and the end of a wider plate;

FIG. 17 is a diagrammatic, perspective view illustrating the application of the invention for simultaneous heating of the ends of a pair of narrow plates and the end of a relatively wide plate;

FIG. 18 illustrates the application of the invention to the heating of the ends of curved plates;

FIG. 19 is a plan view illustrating the application of the invention to the heating of the curved ends of a pair of plates;

FIG. 20 is a combined circuit diagram and diagrammatic, side view of a modification of the invention for the heating of the edges of a partially formed cylinder or pipe;

FIG. 21 is a plan view of the embodiment shown in FIG. 20;

FIG. 22 is a diagrammatic, perspective view of a modification of the embodiment shown in FIGS. 20 and 21;

FIG. 23 is a diagrammatic, perspective view illustrating the use of permanent, bar magnets for producing the magnetic fields for moving the electric arc in accordance with the invention;

FIG. 24 is a diagrammatic, side view illustrating a modification of the apparatus shown in FIG. 23;

FIG. 25 is a diagrammatic, perspective view of a means for producing the arc moving, magnetic field when the arc extends between the electrode and the part to be heated;

FIG. 26 is a diagrammatic, perspective view of the use of permanent, bar magnets for producing the arc moving, magnetic field;

FIG. 27(a) is a diagrammatic, perspective view illustrating the use of a single turn coil for producing the arc moving, magnetic field;

FIG. 27(b) is an end view of a modification of the embodiment shown in FIG. 27(a);

FIGS. 28 and 29 are diagrammatic, side views of modifications of the embodiment shown in FIG. 27(a);

FIG. 30 is a combined circuit diagram and a plan view of apparatus for supplying the arc current for the embodiment of FIG. 1;

FIG. 31 is a fragmentary, combined circuit diagram and diagrammatic, side view of a modification of the embodiment shown in FIG. 30;

FIG. 32 is a combined circuit diagram and diagrammatic, plan view of a modification of the embodiment shown in FIG. 30;

FIG. 33 is a combined circuit diagram and diagrammatic, plan view of a modification of the embodiment shown in FIG. 32;

FIG. 34 is a diagrammatic view, partly in perspective, illustrating the use of gas for modifying the path of the electric arc;

FIG. 35 is a diagrammatic, end view of a modification of the apparatus shown in FIG. 34;

FIG. 36 is a diagrammatic, end view illustrating the use of a pair of differently directed magnetic fields for controlling movement of the electric arc;

Figure 38:
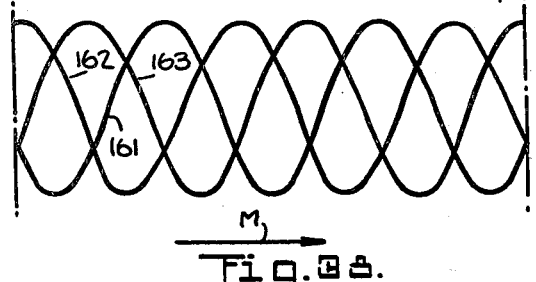
Figure 39:
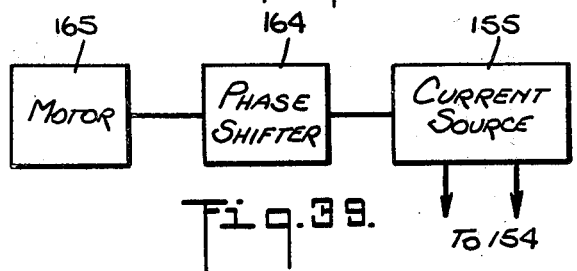
Figure 41:
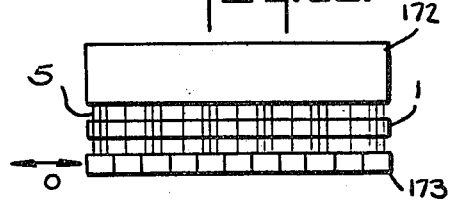
Figure 42:
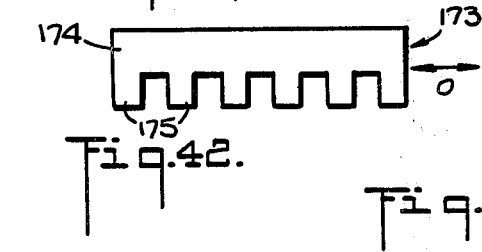
Figure 44:
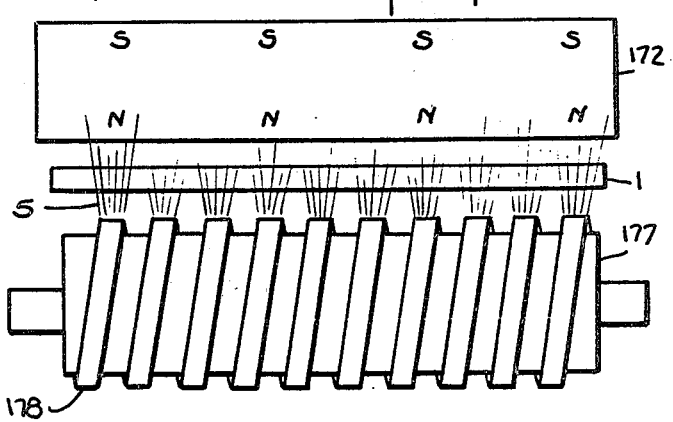
Figure 43:
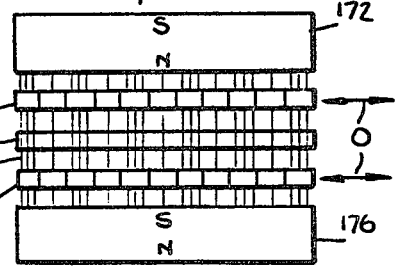

FIGS. 37(a)–37(c) are vector diagrams employed to illustrate the forces on the electric arc produced by a pair of magnetic fields;

FIG. 38 is a diagram illustrating one type of path which may be followed by the electric arc using the principles of the invention;

FIG. 39 is a circuit diagram illustrating means for energizing one of the magnetic field coils illustrated in FIG. 36;

FIGS. 40(a) and 40(b) are end views which illustrate the use of specially shaped permanent, bar magnets for controlling the movement of the electric arc;

FIG. 41 is a diagrammatic, end view illustrating a modified form of means for controlling the magnetic field for varying the path of the electric arc;

FIG. 42 is a plan view of a portion of the apparatus shown in FIG. 41;

FIG. 43 is a diagrammatic, end view of a modification of the apparatus shown in FIG. 41;

FIG. 44 is a diagrammatic, end view of apparatus for modifying the magnetic field and the path of movement of the electric arc;

FIG. 45 is a diagrammatic, plan view, partly in cross-section, illustrating the use of gas to control the movement of the arc extending between a pair of pipe ends;

FIG. 46 is a diagrammatic, end view of a pair of magnetic means for controlling the movement of an arc extending between a pair of pipe ends;

FIG. 47 is an end view of a pipe illustrating one type of path of movement of the electric arc on a pipe end;

FIG. 48 is a diagrammatic, end view of the use of shaped permanent magnets for modifying the path of movement of an electric arc extending between a pair of pipe ends;

FIG. 49 is a diagrammatic, end view of another embodiment of the invention for modifying the path of movement of an electric arc extending between pipe ends;

FIG. 50 is a fragmentary, perspective view of a further embodiment of the invention for modifying the path of movement of an electric arc extending between pipe ends;

FIG. 51 is a diagrammatic, plan view, partly in cross-section, of the use of the embodiment in FIG. 1 for the heating of the ends of a pair of pipes;

FIG. 52 is an end view of the embodiment shown in FIG. 51;

FIG. 53 is a diagrammatic, perspective view illustrating the use of a single turn coil for producing the arc moving, magnetic field when the arc extends between the ends of a pair of pipes;

FIG. 54 is a diagrammatic, cross-sectional, end view illustrating the use of the invention for simultaneous heating of the end of a relatively thin plate and the end of a relatively thick plate;

FIG. 55 is a diagrammatic, plan view of the application of the principles of the embodiment in FIG. 1 to the heating of the end portions of a pair of shafts;

FIG. 56 is a diagrammatic, plan view illustrating the application of the invention to the heating of the ends of a pair of shafts;

FIG. 57 is a diagrammatic, side view illustrating the application of the invention to the heating of an end portion of a shaft;

FIG. 58 is a diagrammatic, plan view illustrating the application of the invention to the heating of the end faces of a pair of shafts;

FIG. 59 is a diagrammatic, plan view, partly in cross-section, illustrating the application of the invention to the heating of the interior surfaces of a ring;

FIG. 60 is a diagrammatic, perspective view illustrating the application of the invention to the heating of a peripheral surface of a rod;

FIG. 61 is a cross-sectional view illustrating the application of the invention to the heating of the internal surface of a pipe;

FIG. 62 is a side view, partly in cross-section, illustrating the modification of the apparatus shown in FIG. 60; and FIG. 63 is a diagrammatic, perspective view illustrating the application of the invention to the heating of the end portion of a shaft.

In understanding the invention, it is important to understand that an electric arc, which is an ionized, electrically conducting gas, behaves as a low inertia conductor in a magnetic field. Accordingly, in a magnetic field the arc moves in accordance with Fleming's Left-hand Rule, and with more than one magnetic field, each differently directed, the motion of the arc is directed along a vector sum of the fields. Heating in the parts between which the arc flows is caused not only by current flow in the parts to and from the ends of the arc, but also by impingement of the gas ions and electrons on the parts. Heating is increased both by increasing the arc current and by increasing the spacing between the parts while maintaining the voltage necessary to sustain the arc. The arc starting voltage is higher than the arc voltage required after the arc is started, and the voltages required depend on the spacing between the parts. The starting voltage required depends on many factors including gas pressure, the nature of the atmosphere, temperature, the shape of the portions between which the arc is generated, frequency of applied voltage, etc., and for air, at standard pressure and temperature and spheres 6.25 cm. in diameter, the arc-over voltage at 60 hertz is about 31 kilovolts per centimeter. The arc also is movable by reason of convection currents or deliberate impingement of a gas on the arc. Depending on the areas of the surfaces between which the arc is produced, the cross-section of the arc may or may not be equal to a dimension of such areas, the arc cross-section being determined by many factors including the gas being ionized and the current flowing in the arc.

The magnitude of the arc current is selected so that with the speed of arc movement, the desired heating is obtained within the desired time while obtaining uniform heating without overheating of any portion of the parts being heated. The current magnitude may, for example, be of the order of one hundred to a few thousand amperes and the speed of traverse of the arc may, for example, be from one traverse per second to many tens of traverses per second, the speed of traverse being determined by the magnitude of the current and the strength of the magnetic field to which the arc is subjected and the speed being variable by varying either.

In the preferred embodiment of the invention for the heating of finite length metal parts, e.g., the edge surfaces of a pair of metal parts, either for the heat treating or the welding thereof, illustrated diagrammatically in FIG. 1, metal plates 1 and 2 are disposed with their edge surfaces 3 and 4 spaced apart and adjacent each other and with a magnetic field extending in the direction of the lines 5 and intermediate the surfaces 3 and 4. The magnetic field may be produced in any conventional manner, such as by permanent magnets or an electrically energized coil, but preferably, is produced by a coil energized by the arc current as described hereinafter.

A pair of "run-on" tabs 6 and 7 of electrically conductive material are electrically connected to one pair of side surfaces 8 and 9 of the plates 1 and 2 and another pair of electrically conductive "run-off" tabs 10 and 11 are electrically connected to the other pair of side surfaces 12 and 13 of the plates 1 and 2. Preferably, the tabs 6, 7, 10 and 11 are made of metal and are cooled, such as by water cooling, but they may be made of graphite or other electrically conductive material if desired. Preferably, the tabs 10 and 11 have their facing surfaces spread apart, as shown in FIG. 1, so that the distance therebetween increases in the direction of movement of the arc 14, indicated by the arrow M, extending between the edge surfaces 3 and 4. The purpose of such spreading of the facing surfaces of the tabs 10 and 11 is to assist in extinguishing the arc when it reaches the tabs 10 and 11, but with a magnetic field of sufficient strength to urge the arc 14 beyond the free ends of the tabs 10 and 11, or if it is unnecessary to extinguish the arc 14 at the tabs 10 and 11, the facing surfaces of the tabs 10 and 11 may be substantially parallel.

The tabs 6, 7, 10 and 11 may be merely pressed against the side surfaces of the plates 1 and 2 to provide electrically conductive contact between the tabs and the plates or the tabs 6, 7, 10 and 11 may be tack welded to the plates 1 and 2 so that they may be removed after the heating of the edge surfaces 3 and 4. A high frequency starter 15 and an arc current source 16, which may be a direct current or an alternating current source of a frequency which is low compared to that of the arc starter 15, are connected to the plates 1 and 2. If desired, the starter 15 and the source 16 may be connected to the tabs 6 and 7 or the tabs 10 and 11 when such tabs are conductively connected to the plates 1 and 2. However, if the tabs 6 and 7, the tabs 10 and 11 or all of them are spaced from the plates 1 and 2, as described hereinafter, by a distance which is small enough for the arc 14 to jump from between the tabs to between the plates 1 and 2 or vice versa, e.g., of the order of a few thousandths of an inch, the starter 15 and the source 16 would be connected to the plates 1 and 2 as well as to the tab or tabs which are spaced from a plate 1 and/or 2. The space between a tab and a plate may be filled with insulation other than air.

The tabs 6 and 7 preferably have sharp pointed projections 17 and 18 having their points close enough so that the arc starter 15, which may, for example, be a model HFAS-1 high frequency arc stabilizer obtainable from Airco, Inc., New York, N.Y., can produce an arc between the points, but the points of the projections 17 and 18 are far enough apart so that the arc 14 is sustained by the arc current source 16 and travels along the edge surfaces 3 and 4.

The arc starter 15 is coupled to the plates 1 and 2, and hence, the tabs 6 and 7, by a high frequency transformer having a primary winding 19 and a secondary winding 20, a resistor 21, a capacitor 22 and a pair of leads 23 and 24. The capacitor 22 has a low impedance at the frequency of the voltage of the arc starter 15 and the secondary winding 20 has a low impedance or resistance for the current of the source 16. The capacitor 22 presents a high impedance to the source 16, and the resistor 21 is a voltage dropping resistor to reduce the voltage produced by the arc starter 15 at the points of the projections 17 and 18 below the arc starting voltage after the arc current flows.

The embodiment shown in FIG. 1 may be used with either a direct current or an alternating current source 16 and with either a static or varying magnetic field represented by the lines 5. Let it first be assumed that the magnetic field is static and that the source 16 is a direct current source. When the arc starter 15 is energized, an arc or spark 14 is formed between the points of the projections 17 and 18, and the voltage of the source 16, which is less than that required to produce an arc between said points, is sufficient to sustain the arc 14. Under the influence of the static magnetic field, which is polarized properly with respect to the polarity of the source 16 to produce such direction of motion, the arc 14 moves from said points in the direction of the arrow M and traverses the edge surfaces 3 and 4, thereby heating them. Preferably, the tabs 6, 7, 10 and 11 are cooled, such as by forming water channels therein to which cooling water is supplied in a conventional manner, to prevent overheating thereof.

After the arc 14 traverses the edge surfaces 3 and 4, it moves to the tabs 10 and 11 where it extinguishes, either by being forced off the free ends of the tabs 10 and 11, or preferably, because the arc 14 reaches a point on the tabs 10 and 11 where the spacing of their facing surfaces is such that the voltage of the source 16 is insufficient to maintain the arc 14. To aid in extinguishing the arc 14 rapidly, the strength of the magnetic field at the tabs 10 and 11 may be greater than the strength thereof in advance of the tabs 10 and 11.

As soon as the arc 14 extinguishes, the voltage at the points of the projections 17 and 18 produced by the starter 15, which may be continuously energized, increases to a level sufficient to produce a new arc at said points, and the arc 14 repeats its traverse of the edge surfaces 3 and 4, arrives at the tabs 10 and 11 and extinguishes as before. The time taken for a single traverse of the surfaces 3 and 4 depends on the magnitude of the arc current, the strength of the magnetic field and the lengths of the edge surfaces 3 and 4 and the tabs 6, 7, 10 and 11, and may be adjusted as desired. It has been found that only a relatively weak magnetic field will produce from two to ten traverses per second.

It will be observed that the arc 14 starts on the tabs 6 and 7 and extinguishes on the tabs 10 and 11, and therefore, any delay or hesitation in the arc movement at starting or extinguishing does not affect the heating of the edge surfaces 3 and 4 as would be the case if the arc were started or extinguished between the edge surfaces 3 and 4.

If the magnetic field is uniform in the direction of the arrow M, the arc 14 will move at a substantially constant speed along the surfaces 3 and 4, provided that the arc current is substantially constant. However, because of the fact that the central portions of the surfaces 3 and 4, i.e., between the ends thereof, are between heated end portions of the surfaces, the central portions will become hotter than the end portions. If it is desired to provide uniform heating, or if the thickness of the plates 1 and 2 varies in the direction of the arrow M, the heating of the edge surfaces 3 and 4 may be varied by adjusting the magnetic field distribution. For example, if the central portions are heated to a higher temperature, the magnetic flux density at the central portions may be increased relative to the flux density at the end portions so as to increase the speed of movement of the arc along the central portions. Similarly, if the thickness of the plates 1 and 2 varies, the distribution of the magnetic flux may be varied in the direction of the arrow M so that the arc 14 traverses thicker portions more slowly than it traverses thinner portions.

Alternatively, the current magnitude or the strength of the magnetic field may be varied in synchronism with the movement of the arc 14 to produce the desired heat distribution. For example, if the magnetic field represented by the lines 5 is an electrically energized coil, the coil energizing current may be varied in magnitude with movement of the arc 14 to vary the speed of movement of the arc 14. Similarly, the magnetic field may be maintained constant, and the magnitude of the arc 14 current may be varied as the arc 14 moves, keeping in mind, however, that the heating varies as the square of the arc current magnitude, whereas it varies only as a first power of the traversing speed of the arc 14.

Thus, let it be assumed that the source 16 is a direct current source, and the magnetic field lines 5 are produced by an electrically energized coil, the coil may be energized by a current having a wave shape corresponding to the desired arc 14 movement and having the correct phase and frequency. The current may be provided by a slaved generator of a known type having an output of adjustable wave shape, phase and duration. In some cases the generator which supplies the coil may be an alternating current generator having an output adjustable in phase and frequency, but it should be noted that if the magnetic field reverses prior to the time that the arc 14 reaches the tabs 10 and 11, the direction of movement of a direct current arc 14 will reverse unless the arc polarity is reversed.

In this latter connection, it is within the scope of the invention to employ a direct current arc 14 with alternating current energization of the coil which produces the field lines 5 or both an alternating current arc 14 and alternating current energization of said coil. In the former case, the arc 14 is not extinguished at the tabs 10 and 11, and instead, the energization of the coil is of such phase and frequency that once initiated by the starter 15, the arc 14 travels from the tabs 6 and 7 to the tabs 10 and 11, reverses direction and returns to the tabs 6 and 7 and repeats such movement until the source 16 is de-energized. In the latter case, the magnetic field coil is energized from a source having the same frequency as the source 16 and of the proper phase, and the operation will be as described in connection with a uni-directional magnetic field and a direct current source 16, keeping in mind that when the magnetic field reverses, the current in the arc 14 reverses causing the arc 14 to continue in the same direction.

As mentioned hereinbefore, a direct current arc 14 has the disadvantage in many cases, but not all, of producing greater heating of one of the edge surfaces 3 and 4 than the other thereof depending upon the polarity of the plates 1 and 2, the plate with the negative polarity being heated more than the other plate. It is, of course, possible to reverse the polarity of the source 16 after the arc 14 has made one or more traverses of the surfaces 3 and 4, but since the arc currents are relatively large, it is not desirable to do so even though the polarity may be reversed intermediate extinction of the arc 14 and restarting thereof. An alternating current arc does not have such disadvantages and for this reason, as well as the fact that alternating current may be supplied from conventional power lines without auxiliary devices, such as rectifiers, and their losses and expense, the use of an alternating current arc 14 is preferred. Furthermore, because of the lack of a need for synchronization of the magnetic field with the movement of the arc 14, the preferred embodiment of the invention comprises an alternating current source 16 and an alternating current energized coil for producing the magnetic field.

The edge surfaces 3 and 4, and metal a small distance inwardly thereof, may be heated by the arc 14 as described hereinbefore until they are heated to the desired temperature which may, for example, be a tempering or annealing temperature, a forge welding temperature or the melting temperature of the metal of the plates 1 and 2. After heating to the desired temperature, the source 16 is de-energized or disconnected from the plates 1 and 2, and the edge surfaces 3 and 4 may be quenched or cooled or may be pressed together to form a weld therebetween. If only one of the plates 1 and 2 is to be tempered or annealed, the other plate may be made of a different metal able to withstand high temperatures and may be cooled in a conventional manner, or the other plate may be made of a conductive carbon, graphite or other electrically conductive material.

If welding is performed, the source 16 may be kept energized and connected to the plates 1 and 2 for a period of time after they have been pressed together and the arc 14 is thereby extinguished to continue heating of the welded portions by reason of the flow of current therethrough (resistance heating) for annealing purposes. The magnitude of the current supplied by the source 16 may, of course, be different from the magnitude thereof used for the arc 14, and preferably, the source 16 would be connected to the plates 1 and 2 in a known manner, e.g., at multiple points distributed with respect to the edge surfaces 3 and 4, so as to provide equally distributed current flow from one of the plates 1 and 2 to the other plate.

Although the arc starter 15 described hereinbefore is preferred, it is apparent that the arc 14 may be initiated in the embodiment of FIG. 1 and in embodiments hereinafter described in other ways, such as by eliminating the arc starter 15 and contacting the projection 17 with the projection 18 while the source 16 is energized and then moving the projections 17 and 18 apart. Instead of moving the projections 17 and 18 toward each other, a conductor electrically connected to one of the tabs 6 and 7 may be moved toward the other tab until it touches the latter and then withdrawn, thereby initiating the arc 14. Alternatively, with the arc starter 15 omitted, the voltage of the source 16 may be momentarily raised to a value which will produce a spark at between the projections 17 and 18 or the source 16 may have an output voltage sufficient to produce such a spark but be connected to the plates 1 and 2 through a voltage dropping resistor which, after the arc 14 is initiated, will reduce the voltage between the edge surfaces 3 and 4 to that required to maintain the desired current in the arc 14. A further alternative for the arc starter 15 is the use of a small quantity of a radioactive isotope at the position of the projection 17 or 18 which, as is known, will ionize the gas in the immediate vicinity thereof and thereby reduce the voltage required to start the arc 14, such as to below the voltage of the source 16. Another alternative is to direct a flame, e.g., a gas flame, between the portions where the arc is to be started.

Although the plates 1 and 2 have been illustrated as flat plates having rectilinear edge surfaces 3 and 4 and having their upper surfaces in the same plane, it will be apparent that the apparatus and principles hereinbefore described may be applied to plates of other shapes and differently disposed. For example, the plates 1 and 2 may be correspondingly curved between the side surfaces 8 and 12 and 9 and 13 thereof or the edge surfaces 3 and 4 may be correspondingly curved, illustrations of such shapes being given in FIGS. 18 and 19. Also, one end of one of the plates 1 and 2 may overlie the other in spaced relation thereto for forming a lap, as distinguished from a butt weld, the edge surface of one plate may face and be spaced from a top or bottom surface of the other plate for forming a T-weld and the plates 1 and 2 may have upturned ends facing each other for forming a flange weld. Furthermore, the plates 1 and 2 may be made of different metals or be of different thicknesses provided that the heating thereof is properly adjusted in the ways hereinafter described.

If desired, the plates 1 and 2 may be heated for the purposes described in connection with FIG. 1 by means of the apparatus illustrated in FIG. 2. In FIG. 2, the plates 1 and 2 are in abutting relation at their edge surfaces and the meeting plane of the edge surfaces is vertically below the narrow lower portion of an electrode 25 which may be water cooled, such as by means of the tubes 26 and 27 which connect to a central passageway in the electrode 25. The plates 1 and 2 are electrically connected to the lead 24 shown in FIG. 1 and the electrode 25 is connected to the lead 23 shown in FIG. 1. The narrow end of the electrode 25 is spaced from the meeting plane of the edge surfaces as illustrated in FIG. 3 and is disposed adjacent a raised point 28 on the upper surface of a tab 29 corresponding to the tabs 6 and 7 in FIG. 1.

The end of the electrode 25 opposite from the end adjacent to the raised point 28 is spaced from and adjacent to a downwardly sloping "run-off" tab 30 which corresponds to the tabs 10 and 11 in FIG. 1. The magnetic field represented by the lines 5 extends at rightangles to the magnetic field represented by the lines 5 in FIG. 1.

The operation of the apparatus illustrated in FIG. 2 is similar to that of the apparatus shown in FIG. 1 except that the arc 14 extends between the electrode 25 and the upper surfaces of the plates 1 and 2 at the meeting plane of the edge surfaces. Thus, the arc starter 15 produces an arc 14 between the lower portion of the electrode 25 and the raised point 28, which arc 14 is caused to move in the direction of the arrow M by reason of the magnetic field represented by the lines 5. When the arc 14 reaches the end of the electrode 25 adjacent the tab 30 it is extinguished both by reason of the magnetic field, which forces it toward the rightmost end of the electrode 25, and the increased spacing in the direction of the arrow M between the lower portion of the electrode 25 and the upper surface of the tab 30. The fields and the arc source may be of the various kinds described in connection with the apparatus of FIG. 1.

After the portions of the plates 1 and 2 at their edge surfaces are heated to the desired temperature, the plates 1 and 2 may be separated for treatment or they may be pressed together for forge welding. If such portions have been heated to their melting temperature, they may be merely cooled or may be pressed together and cooled. One advantage of the apparatus shown in FIG. 2 is that after the welding of the plates 1 and 2 together, the arc 14 may be restarted and again caused to traverse such portions for heat treating purposes, the current in the arc 14 preferably being less than the value thereof during the initial heating for welding purposes.

Although the apparatus of FIG. 2 has the disadvantage that a substantial amount of waste heat is produced in the electrode 25, the apparatus shown in FIG. 2 has practical applications, particularly when it is desired to produce a melt weld between the edges of the plates 1 and 2 and when the plates 1 and 2 form part of a device, such as a circular pipe, which has an electrically conductive path interconnecting the portions of the plates 1 and 2 remote from the edge surfaces to be joined. For example, in melt welding it is difficult to bring the parts to be joined to melting temperature in spaced relation and then force them together without undesirable distortion of the weld or loss of weld metal. In the case where the plates 1 and 2 are portions of a pipe, the backside of the pipe, i.e., the portion thereof which is spaced from the edge surfaces and which interconnects the plate portions 1 and 2, forms a current path of low resistance or impedance for direct current or low frequency current which, in effect, short circuits the arc current source. By using the apparatus shown in FIG. 2, it is possible to establish the arc 14 even if the plates 1 and 2 are connected together by a low resistance or impedance means.

With melt welding of the edges of the plates 1 and 2, it is desirable to use a support, such as a support 31 illustrated in FIGS. 2 and 3, to prevent loss or downward bulging of the molten metal at the edge surfaces in melt welding. The support 31, which preferably is made of a high temperature resistant insulating material, such as silicon nitride, extends on both sides of the plane of the meeting of the edge surfaces as shown in FIG. 3 and extends at least along the full length of the edge surfaces to be joined.

In the embodiment illustrated in FIGS. 2 and 3, the electrode 25 is equidistant from the flat upper surfaces of the plates 1 and 2. If it is desired to vary the heating of the upper surfaces in the direction of movement of the arc 14, the spacing between various portions of the electrode 25 and the upper surfaces may be varied by suitably shaping the electrode 25, e.g., the electrode 25 may be shaped so that its lower surface is nearer the plates 1 and 2 where less heating is desired and is farther from the plates 1 and 2 where more heating is desired. Similarly, if the plates 1 and 2 are not flat, i.e., the upper surfaces are irregular or curved, the electrode 25 may be correspondingly shaped at its lower surface so that the desired spacing or spacings between the lower surface of the electrode 25 and the upper irregular or curved surfaces of the plates 1 and 2 is maintained.

In the embodiments previously described, the arc 14 follows a discontinuous path of finite length on one or more parts to be heated. Accordingly, except when the movement of the arc 14 is reversed at the end tabs, the arc 14 must be repeatedly extinguished and re-established in order to obtain multiple passes along, or traverses of, the part or parts. In the embodiment illustrated in FIGS. 4 and 5 which is similar to the embodiment shown in FIGS. 2 and 3, it is not necessary either to extinguish and re-establish the arc 14 or to reverse the direction of movement thereof even though the surfaces to be heated are discontinuous and of finite length.

In the embodiment shown in FIGS. 4 and 5, the plates 1 and 2 are abutting at their edge surfaces and the arc 14 is established between a ring electrode 35 which has a narrow portion adjacent the meeting plane of the edge surfaces and extending around such edge surfaces. If the plates 1 and 2 can be removed from within the electrode 35 after they are joined, the electrode 35 may be one integral part, but if desired, the electrode 35 may be made of two separable parts joined along a line 36. Preferably, the electrode 35 is cooled, such as by supplying a cooling fluid to the tube 37 and withdrawing it from the tube 38.

With the arrangement of FIGS. 4 and 5, it is immaterial where the arc 14 is initiated, and it may be initiated by the starter 15 at any random point. However, if it is desired to initiate it at a specific point, the inner surface of the electrode 35 may be provided with a projection, like a projection 17, 18 or 28, extending toward the edge surfaces of the plates 1 and 2.

After the arc 14 is started, it is caused to move along the surfaces of the plates 1 and 2 at the meeting plane of the edge surfaces by reason of the magnetic field represented by the lines 5, which magnetic field is not only above the plates 1 and 2, but also below and at the side surfaces of such plates. The arc 14 will continue to traverse the upper, lower and end surfaces of the plates 1 and 2 at or adjacent the meeting plane of the edge surfaces as long as the arc current source 16 is energized. When the desired temperature is reached at the edge surfaces, the arc current source is deenergized, and if the plates 1 and 2 have been heated to forge welding temperature they may be pressed together and allowed to cool. If the edge surfaces have been heated to melting temperature, the molten metal may be merely allowed to cool or the plates 1 and 2 may be pressed together and the molten metal allowed to cool. For heat treating purposes, the so-joined portions of the plates 1 and 2 may, as described in connection with the embodiment shown in FIGS. 2 and 3, be further subjected to an arc 14.

It will be observed that in the operation of the embodiment shown in FIGS. 4 and 5 it is merely necessary to start the arc 14 initially and to extinguish the arc 14 only when the necessary heating has been accomplished. In the meantime, the arc 14 will traverse the surfaces to be heated a plurality of times without the need for reversing the direction of movement of the arc 14. In addition, the arc 14 will heat not only the upper but also the lower and side surfaces of the plates 1 and 2 thereby providing heating which differs from the heating of the plates 1 and 2 obtained with the embodiment illustrated in FIGS. 2 and 3 which may be desirable in some cases. However, the heating obtained with the embodiment shown in FIGS. 2 and 3 is greater at the upper surfaces of the plates 1 and 2 which is advantageous when it is desired to keep the protrusion of weld metal at the lower side thereof to a minimum.

In the embodiment of the invention illustrated in FIGS. 4 and 5, the arc 14 will, because of the time it impinges on the ends 40 and 41 of the plates 1 and 2, tend to heat such ends 40 and 41 more than the remainder of the plates 1 and 2 at the meeting plane of the edge surfaces unless special precautions are taken. One method of reducing the heating at the ends is to increase the magnetic flux density at such ends and thereby, to increase the speed of movement of the arc 14 at such ends. Another method of reducing the heating at the ends is to reduce the spacing between the electrode 35 and the ends 40 and 41 and thereby to reduce the heating effect of the arc 14 on such ends.

In the embodiments illustrated in FIGS. 2-5 the edge surfaces of the plates 1 and 2 preferably are in contact in order to aid in producing uniform heating thereof. Thus, if the edge surfaces of the plates 1 and 2 are slightly spaced, the arc 14 will tend to wander back and forth between the two plates as it moves along the electrode 25 or 35, and this is true even if the cross-sectional dimension of the arc 14 is sufficient to bridge the gap between the plates 1 and 2.

If it is desired to maintain the edge surfaces of the plates 1 and 2 in spaced relation during the heating thereof, the embodiments of the invention illustrated in the next several figures of the drawings may be employed. Referring specifically to FIG. 6, the electrode 45, which has arcuate ends 46 and 47, is disposed intermediate the edge surfaces 3 and 4 of the plates 1 and 2, but is mounted on a support 48 so that it may be moved into and out of the space intermediate the edge surfaces 3 and 4. The support 48 may also be used to supply cooling fluid to the electrode 45. The electrode 45 is spaced from the edge surfaces 3 and 4 so that the arc 14 may be produced between the electrode 45 and the edge surfaces 3 and 4 in the manner previously described.

The side surfaces 8, 9, 12 and 13 of the plates 1 and 2 are engaged by tabs 49 and 50 like those described hereinbefore, and each of the tabs 49 and 50 has an arcuate inner surface adjacent the ends 46 and 47 of the electrode 45. However, the principal function of the tabs 49 and 50 is to provide a path for the arc 14 to follow when it leaves one of the plates 1 and 2 and then transfers to the other of the plates 1 and 2.

The magnetic field lines 5 extend into the space between the electrode 45 and the edge surfaces 3 and 4 and between the inner surfaces of the tabs 49 and 50 and the electrode 45. Accordingly, after the arc 14 has been started, which may be at any point along the surfaces of the electrode 45, the edge surfaces 3 and 4 and the inner surfaces of the tabs 49 and 50, the arc 14 travels along such surfaces in a direction dependent upon the polarity of the terminals connected to the plates 1 and 2 and the electrode 45 and the direction of the magnetic field represented by the lines 5. Preferably, the electrode 45 is connected to the positive terminal of the arc current source, when a direct current source 16 is employed, to reduce the heating of the electrode 45. After the arc 14 has been started, it will traverse the edge surfaces 3 and 4 of the plates 1 and 2 and the inner surfaces of the tabs 49 and 50 until the arc current source is de-energized or is disconnected from the plates 1 and 2 or the electrode 45.

If the portions of the plates 1 and 2 adjacent the edge surfaces 3 and 4 are merely to be heat treated, they may be removed from between the tabs 49 and 50 after the desired temperature has been reached and then so heat treated. However, if it is desired to produce a weld between the portions of the plates 1 and 2 at the edge surfaces 3 and 4, the electrode 45 is moved upwardly by means of the support 48 and out of the space between the edge surfaces 3 and 4, thereby permitting the edge surfaces 3 and 4 to be pressed together.

If, for some reason, it is desired to heat the edge surfaces 3 and 4 non-uniformly, for example, if the edge surfaces 3 and 4 vary in thickness in the direction of the arrow T shown in FIG. 6, the electrode 45 may be shaped so as to thereby cause the length of the arc 14 to vary as it moves along the edge surfaces 3 and 4. For example, if the plates 1 and 2 are thicker at the portions thereof in the direction of the arrow T, the spacing between such portions and the electrode 45 may be greater than the spacing between the electrode 45 and the thinner portions of the plates 1 and 2.

Contact of the tabs 49 and 50 with the side edge surfaces of the plates 1 and 2 where they meet the edge surfaces 3 and 4 tends to cause less heating of the edge surfaces 3 and 4 at their ends, because the tabs 49 and 50, which may be water cooled, act as heat sinks. In order to reduce such undesirable effect, the tabs 49 and 50 may be shaped as shown in FIG. 7, only tab 50 being illustrated in FIG. 7 but the tab 49 being similarly shaped. As shown in FIG. 7, the tab 50 may be provided with small cut-outs 51 and 52 which prevent contact of the tab 50 with the portions of the side edge surfaces 12 and 13 which join the edge surfaces 3 and 4. The cut-outs 51 and 52 are selected so that the arc 14 can jump from the edge surfaces 3 and 4 to the tab 50 across the gaps between the tab 50 and the plates 1 and 2 without extinguishing. The size of the gaps depends on the cross-sectional dimension of the arc 14 and on other factors, but the width thereof, i.e., the dimension in the direction of the movement of the arc 14, may, for example, be of the order of five to ten thousandths of an inch. If desired, the gaps between the tab 50 and the plates 1 and 2 may be filled with insulating material of low heat conductivity.

As illustrated in FIG. 8, the tabs 49 and 50 may be completely out of conductive contact with the plates 1 and 2, so that gaps 53, 54, 55 and 56 are provided therebetween. The spacing of the tabs 49 and 50 with respect to the side edge surfaces of the plates 1 and 2 is selected in the manner described hereinbefore and, although it is not necessary to do so, the gaps 53–56 may be filled with a solid insulation of low heat conductivity. However, when the tabs 49 and 50 are not electrically connected to the plates 1 and 2 by means of contact therewith, the tabs 49 and 50 are electrically connected to the arc current source 16 in the manner illustrated in FIG. 8.

With the tabs 49 and 50 out of contact with the plates 1 and 2 as illustrated in FIG. 8, it is readily possible to provide heating of the edge surface 3 which differs from the heating of the edge surface 4. For example, such different heating may be desirable when the plates 1 and 2 are made of metals which must be heated to different temperatures, either for heat treatment or welding purposes, or if the plates 1 and 2 are of different thicknesses but of the same metals, it usually is desirable to provide less heating of the thinner of the two plates in order that both plates will be at approximately the same temperature when welding is to be performed.

FIG. 9 illustrates one embodiment of the invention for providing heating of the edge surface 3 which is different from the heating of the edge surface 4. In FIG. 9, the arc starter 15 and the arc current source 16 are connected to the plates 1 and 2 and to the electrode 45 in the manner described hereinbefore, but, in addition, the tab 49 is connected to one terminal of the source 16 through the primary winding of a sensing transformer 60, and the tab 50 is connected to the arc current source 16 through the primary winding of a second sensing transformer 61. The secondaries of the transformers 60 and 61 are connected to a conventional control switch 62, which, when it receives a pulse from the transformer 60, assumes one condition and which, when it receives a pulse from the transformer 61, assumes a second or different condition. The control switch 62 has a pair of outputs, one output being connected by the leads 63 and a manually operable switch 65 to an arc current control 67 for controlling the magnitude of the output voltage of the source 16, and the other output being connected by the leads 64 and a manually operable switch 66 to the control of a variable current source 68. The variable current source 68 supplies current to the magnetic field means 69 which produces the magnetic field represented by the lines 5 in FIG. 6.

Although FIG. 9 shows a control switch 62 for controlling both the output voltage of the source 16 and the current supplied from the source 68 to the magnetic field means 69, and both may be controlled for varying the heating of the edge surfaces 3 and 4, only one of the two controls may be used if desired. For example, either the control of the current source 68 or the control 67 for the output voltage of the current source 16, may be omitted.

To illustrate the operation of the apparatus shown in FIG. 9, let it be assumed that the edge surface 3 requires less heating than the edge surface 4, that it is desired to control the relative heating solely by control of the arc current, and that the arc 14 extends between the electrode 45 and the edge surface 3 and is travelling from the lower end to the upper end of the electrode 45, as viewed in FIG. 9. Of course, the switch 56 would be closed and the switch 66 would be open, and the control switch 62 would be set to control the arc current control 67 so that the desired value of arc current is produced between the electrode 45 and the edge surface 3. The magnetic field causing the movement of the arc 14 will be substantially constant in value.

When the arc 14 reaches the tab 50 and extends between the electrode 45 and the tab 50, it will produce a pulse at the output of the transformer 61 because of the flow of current between the electrode 45 and the tab 50, and such pulse will operate the control switch 62 so as to raise the output voltage of the source 16 and thereby increase the current of the arc 14. Although such increase in the arc 14 current will also increase the speed of movement thereof along the edge surface 4, the heating increases as the square of the current magnitude, whereas the speed of traverse increases only as the first power of the increase in current magnitude. Therefore, as the arc 14 proceeds from the tab 50 to the edge surface 4 and therealong, it will produce heating of the edge surface 4 which is greater than the heating of the edge surface 3 produced during the traverse of the latter by the arc 14.

When the arc 14 now arrives at the tab 49 a pulse will appear on the output of the transformer 60 which will re-set the control switch 62 and thereby lower the output voltage of the source 16 to the value it previously had when it traversed the edge surface 3. The arc 14 will pass from the tab 49 to the edge surface 3 and repeat its traverse thereof. Accordingly, by properly selecting the output voltages of the source 16, which are set by the arc current control 67, the desired heating of the edge surface 3 with respect to the desired heating of the edge surface 4 may be obtained.

Assuming now that the conditions are the same as those previously assumed when the relative heating is controlled by current magnitude alone, the switch 65 may be opened and the switch 66 closed, which would cause the relative heating to be controlled by the magnitude of the magnetic field produced by the magnetic field means 69, and hence, the speed of movement of the arc 14, the current in the arc 14 being maintained substantially constant at the desired value because the switch 65 is open.

Under these conditions, current in the magnetic field means 69 will be set by the variable current source 68 so as to produce a relatively high speed of movement of the arc 14 along the edge surface 3. When the arc 14 reaches the tab 50 the pulse produced at the output of the transformer 61 will cause the control switch 62 to reduce the current output of the source 68 and thereby reduce the strength of the magnetic field to which the arc 14 is subjected during its traverse of the edge surface 4. Accordingly, the arc 14 will move along the edge surface 4 more slowly than it did along the edge surface 3, thereby causing greater heating of the edge surface 4.

When the arc 14 reaches the tab 49, the pulse at the output of the transformer 60 will operate the control switch 62 so as to increase the current output of the source 68 and thereby again produce a magnetic field of greater magnitude. The arc 14 will then traverse the edge surface 3 in a period of time shorter than the period of time required to traverse the edge surface 4.

In the description of the apparatus shown in FIG. 9, which has been set forth hereinafter, it has been assumed that the relative heating is controlled only by either the control of the arc current or by control of the magnetic field. It will be apparent to those skilled in the art that the relative heating may be controlled by simultaneous control of both the magnetic field and the arc current, both the switch 65 and the switch 66 being closed.

Another way in which relative heating of the edge surfaces 3 and 4 may be controlled using only the control of the current in the arc 14 is illustrated in FIG. 10. In the apparatus shown in FIG. 10, the lead 23 of the arc current source 16 is connected directly to the plate 2 and the tabs 49 and 50, but it is connected to the plate 1, the edge surface 3 of which is to receive less heating, through a variable resistor 70. Thus, when the arc 14 extends between the electrode 45 and the edge surface 3 the voltage between the electrode 45 and the plate 1 will be less by reason of the voltage drop through the resistor 70. However, when the arc 14 extends between the electrode 45 and the edge surface 4, the resistor 70 is out of the arc current circuit so that the voltage between the electrode 45 and the plate 2, and hence, the current, will be greater than the voltage and current between the electrode 45 and the plate 1 when the arc 14 extends between the latter two. By suitable adjustment of the resistor 70, the desired relative heating of the edge surfaces 3 and 4 may be obtained.

In the description of the embodiment shown in FIG. 10, it has been assumed that the arc 14 moves clockwise around the electrode 45 as viewed in FIG. 10. It will be noted that the arc current, and hence, the speed of the arc 14, does not reduce until after the arc leaves the tab 49. If the arc 14 were to be moving in the counter-clockwise direction in FIG. 10, it will be noted that the change in speed of the arc 14 would not occur until after leaving the tab 50. FIG. 11 shows a modification of the apparatus illustrated in FIG. 10, in which the tabs 49 and 50 are divided into two parts 49a and 49b and 50a and 50b, respectively, to provide gaps 71 and 72 therebetween, which are small enough to be bridged by the arc 14. From an examination of FIG. 11, it will be noted that the parts 49a and 50a of the tabs associated with the edge surface 3 are at the same voltage as the edge surface 3 and the parts 49b and 50b are at the same voltage as the edge surface 4, so that the change in arc current and speed of movement of the arc 14 will occur at the tab parts, and the current in the arc 14 and speed of movement thereof will reach, on the tab parts, the values which they have when the arc 14 impinges on an edge surface 3 or 4.

As mentioned hereinbefore, the apparatus and principles of the invention are useful in connection with the heating and welding or treatment of metal parts other than electrically isolated flat metal plates of the same thickness, width and metal. For example, the plates illustrated may be portions of a generally cylindrical pipe and the plates may be of different metals, thicknesses or widths. The methods and apparatus of the invention are also useful in joining the edge surfaces of a metal plate 2 to the side surface of a metal plate 1 to thereby form a T-weld as illustrated in FIG. 12.

FIGS. 12-19 illustrate only the portions of the previous embodiments necessary for an understanding of the invention, and it will be understood that the embodiments shown in FIGS. 12-19 also include tabs, magnetic field generating means, an arc current source and, preferably, an arc starter.

In the embodiment of FIG. 12 the electrode 45 is disposed intermediate the edge surface 4 of the plate 2 and the side surface 75 of the plate 1, the arc 14 being produced between the electrode 45 and the plates 1 and 2 and traversing a portion of the side surface 75 and the edge surface 4 in the manner previously described. Because of the location of the path of the arc 14 on the side surface 75, it is desirable to heat the side surface 75 more than the edge surface 4 and the means described hereinbefore may be employed for accomplishing such difference in heating. After the side surface 75 and the edge surface 4 have been heated to the desired temperatures, the electrode 45 may be removed and the edge surface 4 pressed against the heated portion of the side surface 75 to form a weld.

FIG. 13 illustrates the use of the invention in connection with the welding of a relatively thin plate 2 to a relatively thick plate 1. The arc 14 between the electrode 45 and the plates 1 and 2 traverses the edge surfaces 3 and 4 of the two plates in the manner previously described, and conductive blocks 76 and 77, which may be of copper and water cooled, are disposed respectively above and below the upper and lower surfaces of the relatively thin plate 2 with a small gap between the blocks 76 and 77 and the plate 2. The gaps are provided to reduce heat flow by conduction from the plate 2 to the blocks 76 and 77 and are of such a dimension that the arc 14 can bridge the gaps. The conductive blocks 76 and 77 are the same electric potential as the plate 2.

As the arc 14 traverses the edge surface 3, the electrode 45 is moved up and down as indicated by the arrow U, so that during the course of several traverses of the surface 3 by the arc 14, the arc 14 traverses all or substantially all of the surface 3, it being noted that the cross-sectional dimension of the arc 14 is less than the thickness of the plate 1. Similarly, when the arc 14 extends from the right-hand side of the electrode 45, as viewed in FIG. 13, the electrode 45 is moved up and down so that part of the time it is on the edge surface 4 of the plate 2, and part of the time it is on the adjacent edge surfaces of the blocks 76 and 77. In this way, the surface 3 receives more heating than the edge surface 4 of the plate 2 and the surfaces 3 and 4 may be brought to substantially the same temperature before the electrode 45 is moved from between the plates 1 and 2 and the surfaces 3 and 4 are pressed together.

The apparatus shown in FIG. 13 could also be used for heating the edge surfaces of a pair of plates having a thickness greater than the cross-sectional dimension of the arc 14. For example, the plate 2 could have the same thickness as the plate 1 shown in FIG. 13, the blocks 76 and 77 could be omitted and the electrode 45 could be moved up and down as described to provide heating over the entire edge surfaces 3 and 4 of such plates 1 and 2.

FIG. 14 illustrates the application of the methods and apparatus of the invention to the production of a lap weld between the end portions of a pair of plates 1 and 2. In FIG. 14, the lower surface of the plate 1 slightly overlies the upper surface of the plate 2, with such surfaces thereof in spaced relation, and the electrode 45 is intermediate and in spaced relation to said lower and upper surfaces. The arc 14 is caused to traverse the lower surface of the plate 1 and the upper surface of the plate 2 in the manner previously described, and after such surfaces have been brought to the desired welding temperature, the electrode 45 is removed and the overlapping portions are pressed together in a conventional manner, producing a weld therebetween. Similarly, such surfaces of the plates 1 and 2 may be heat treated rather than welded.

In the embodiment of FIG. 15, the plates 1a and 2a have upturned end portions 80 and 81 in spaced apart relation with an electrode 45 intermediate and spaced from such portions 80 and 81. The arc 14 is produced between the electrode 45 and the facing surfaces of the portions 80 and 81 and traverses such facing surfaces in the manner previously described. The arc 14 may be caused to cover a greater area of each of the facing surfaces of the portions 80 and 81 by moving the electrode 45 up and down as the arc 14 traverses the facing surfaces. After the facing surfaces of the portions 80 and 81 reach the desired welding temperature, the electrode 45 may be removed permitting the portions 80 and 81 to be forced together to produce a weld therebetween.

FIG. 16 illustrates the heating of a narrower plate 2 to a wider plate 1 using the electrode 45 intermediate and spaced from the edge surfaces thereof, and a pair of modified tabs 49c and 50c. The heating of the edge surfaces by the arc 14 is obvious from the description set forth hereinbefore.

FIG. 17 illustrates the heating of the edge surfaces of a plate 1 to the edge surfaces of a pair of narrower plates 2b and 2c. The plates 2b and 2c are electrically interconnected by a conductive block 82 shaped to provide a pair of gaps 83 and 84 between the block 82 and the plates 2b and 2c which can be bridged by the arc 14 as it is moved with respect to the electrode 45. The gaps 83 and 84 aid in preventing removal of heat by conduction from the plates 2b and 2c, the block 82 normally being water cooled. The manner in which the edge surfaces of the plates 1, 2b and 2c are heated by the arc 14 is believed to be obvious from the description hereinbefore given.

FIG. 18 illustrates the heating of the edge surfaces of a pair of curved plates 1 and 2 and FIG. 19 illustrates the heating of the edge surfaces of a pair of plates 1 and 2, the edge surfaces of which are curved in a complementary manner.

As mentioned hereinbefore, the apparatus and methods described in connection with FIG. 1 are applicable to the heating of metal parts other than those shown in FIG. 1, and such apparatus and methods may be used in heating metal parts of the type shown in FIGS. 12-19, the arc 14 extending between the parts to be heated rather than from the electrodes 45, 45a or 45b to such parts.

Also, as mentioned hereinbefore, the embodiment illustrated in FIG. 1 cannot be used when the plates 1 and 2 are interconnected by conductive means which effectively short circuit the arc current source 16. However, the embodiment of FIG. 1 is advantageous in that all of the energy of the arc 14 is used for heating the parts to be heated rather than both the electrode and one or more of the parts.

An embodiment of the invention which permits the use of the apparatus shown in FIG. 1 for the welding together of the edges of an almost completely formed cylinder to form a continuous ring is illustrated in FIGS. 20 and 21, FIG. 20 being a combined schematic and diagrammatic end view, partly in cross-section, and FIG. 21 being a plan view of the embodiment in FIG. 20 with the magnetic field producing means removed for ease in illustration.

FIGS. 20 and 21 show an almost completely formed cylindrical ring 90 having spaced apart edge surfaces 91 and 92 which are to be joined by welding. A solenoid 93 having a core formed of two parts 94 and 95, the part 95 being separable from the part 94, is mounted so that the part 95 extends within the ring 90 and axially thereof. Thus, in effect, the ring 90 forms a one-turn secondary winding of a transformer having a primary winding or solenoid 93 and a core formed of parts 94 and 95. Until the arc 14 is established between the edge surfaces 91 and 92, the secondary winding formed by the ring 90 is open circuited, so that when the solenoid or primary winding 93 is energized a voltage is developed between the edge surfaces 91 and 92. When such voltage is of sufficient magnitude it will sustain the arc 14 between the edge surfaces 91 and 92 after the arc 14 has been established between the projections 17 and 18 on the tabs 6 and 7 by the arc starter 15. However, in order to establish such voltage with rings of ordinary size and with a solenoid 93 and core parts 94 and 95 of practical size, it is necessary that the frequency of the source which energizes the solenoid 93 be at least 1000 cycles per second. Currents of such frequencies are readily obtainable from well known types of apparatus.

The arc 14 is subjected to a magnetic field by means of a further solenoid 98 having a core 99 which extends from adjacent the upper ends of the tabs 10 and 11 to the lower ends of the tabs 6 and 7 as viewed in FIG. 21. The solenoid 98 is connected to the same AC source as the solenoid 93 through a phase shifter 100 which is used to compensate for the current phase shift of the arc 14 with respect to the phase of the voltage of the source which supplies both the solenoids 93 and 98. Accordingly, after the arc 14 has been produced between the projections 17 and 18 by the arc starter 15, the arc 14 moves upwardly, as viewed in FIG. 21, until it is extinguished at the tabs 10 and 11 as described in connection witn FIG. 1. Thereafter, the arc 14 is restarted at the projections 17 and 18 and again traverses the edge surfaces 91 and 92. In this manner, the edge surfaces 91 and 92 are heated to the desired welding temperature and may thereafter be pressed together to form a weld between the edge surfaces 91 and 92 and a continuous circular ring.

A bar 101 of laminated magnetic material may be placed below the gap between the edge surfaces 91 and 92 for the purpose of directing and increasing the magnetic field produced by the solenoid 98. Also, even though the extent of the ring 90 may present a relatively low impedance to currents of the frequency of the alternating current source, it will present a relatively high impedance to the high frequency arc starter 15, which may, for example, have a frequency of 100 kilohertz or higher. In the event that it is desired to increase the impedance of the ring 90 with respect to the currents of the arc starter 15, a bar of magnetic material 102, such as a bar of ferramic, may be included within the ring 90 to increase the impedance thereof with respect to the currents supplied by the arc starter 15.

The separate solenoid 98 with the core 99 and the associated bar 101 for producing the magnetic field which causes the arc 14 to traverse the edge surfaces 91 and 92 may be eliminated with the arrangement illustrated in FIG. 22, which is a diagrammatic illustration of a single solenoid and core for both inducing voltage for sustaining the arc 14 and for producing the magnetic field which causes the arc 14 to traverse the edge surfaces 91 and 92. In FIG. 22, for ease of illustration, components shown in FIGS. 20 and 21, such as the end tabs, the arc starter, etc., have been omitted.

In the embodiment of FIG. 22, a solenoid 93a surrounds a portion of a core 94a of laminated magnetic material which is completed by a bar 95a of laminated magnetic material, the bar 95a being separable from the core 94a. The solenoid 93a, in combination with the core 94a and bar 95a, induces voltage and currents in the ring 90 in the manner described in connection with FIGS. 20 and 21.

The core 94a and the bar 95a also have projections 103 and 104 of magnetic material which extend, respectively, above and below the gap between the edge surfaces 91 and 92, and such projections 103 and 104 produce a magnetic field in the gap for causing the arc 14 to traverse the edge surfaces 91 and 92. The phase of the magnetic field produced by the projections 103 and 104 may be adjusted, if necessary, in a conventional manner, such as by the use of high conductivity rings encircling the projections 103 and 104.

There are many ways of providing the magnetic field represented by the lines 5 in the drawings. The solenoid 98 and the core 99 shown in FIG. 20 illustrate one form of means for producing an alternating magnetic field which is required in some embodiments of the invention, such as the embodiments shown in FIGS. 20–22. However, in certain cases, e.g., when the magnetic field may be constant and unidirectional, the magnetic field may be produced by a permanent magnet of the proper polarity and properly disposed with respect to the path of the arc 14. For example, when the embodiment shown in FIG. 1 requires a constant and unidirectional field, a single permanent magnet, in bar form, may be disposed above or below the gap between the edge surfaces 3 and 4. Alternatively, a pair of permanent, bar magnets may be disposed with one above and one below the gap between the edge surfaces 3 and 4, the poles of such magnets nearest each other being of opposite polarity. However, because of the heat, spume, etc. at the edge surfaces 3 and 4, it is desirable to displace the magnetic field producing elements with respect to the gap between the edge surfaces 3 and 4. FIGS. 23 and 24 illustrate such displacement when permanent magnets are used.

In FIG. 23, a pair of permanent, bar magnets 105 and 106, magnetized so as to be polarized in a direction perpendicular to their lengths, are disposed on opposite sides of the gap between the plates 1 and 2 and will produce a magnetic field having at least a component thereof directed through the gap and generally perpendicular to the axis of the arc 14.

If it is desired to increase the strength of the magnetic field and/or make the field lines more nearly parallel to the edge surfaces 3 and 4, the bars 105 and 106 may be supplemented by a further pair of permanent, bar magnets 107 and 108 polarized and disposed as shown in FIG. 24.

If it is desired to produce a magnetic field extending parallel to the surfaces of the plates 1 and 2, such as in the embodiments illustrated in FIGS. 2–5 and 14, the magnetic field producing means illustrated in FIGS. 25 and 26 may be employed.

In FIG. 25, the magnetic field is produced by a core 110 energized by current flowing in the winding 111.

In FIG. 26, the magnetic field is produced by disposing the permanent, bar magnets 105 and 106 as shown in FIG. 26, but in the event that the plates 1 and 2 are made of magnetic material, the bars 105 and 106 would be supported in spaced relation to the upper surfaces of the plates 1 and 2.

In a preferred embodiment of the invention, the magnetic field is produced by means of a coil of one or more turns connected in series with the arc current circuit. FIG. 27(a) illustrates a single turn coil (which may have more turns) which is disposed with respect to the gap between the edge surfaces of the plates 1 and 2 as illustrated in FIG. 27(a). The coil 112 is connected in series with the leads 23 and 24 connected to the arc current source 16.

The coil 112 may, for example, be made of copper tubing through which water is caused to flow for cooling purposes. The coil 112 may also be associated with cores 113 and 114 of magnetic material, as shown in FIG. 27(b), to direct the magnetic field lines 5 into the gap between the plates 1 and 2 and to increase the intensity of the field produced.

As shown in FIG. 28, the coil 112 may comprise two turns, one turn above the upper surfaces of the plates 1 and 2 and one turn below the lower surfaces of the plates 1 and 2 for producing magnetic field lines 5 extending into the gap between the plates 1 and 2.

For producing magnetic field line 5 extending parallel to the major surfaces of the plates 1 and 2, the coil 112 may be disposed as illustrated in FIG. 29.

It has been mentioned hereinbefore that when the arc 14 in an alternating current arc, the current magnitude and the speed of movement, and hence, the heating, varies with the position of the arc 14 with respect to the surfaces being heated with either a constant magnitude magnetic field or a magnetic field which is alternating because it is produced by an alternating current. This is true because the heating varies with the square of the current magnitude and with the first power of the speed of movement. With apparatus of the type described in connection with FIGS. 27–29 in which the magnetic field producing means is in series with the arc current circuit, generally uniform heating of the surfaces is produced when the arc current is direct current, but even though there is partial compensation when the arc current is alternating current because the arc movement speed increases and decreases with the arc current, the heating of the surfaces increases with the increase of the arc current and vice versa.

One method for compensating for the non-uniform heating with an alternating current arc is to increase the magnitude of the magnetic field in synchronism with and at a greater rate than the increase in magnetic current. This is not, of course, possible when the magnetic field coil is in series with the full current of the arc 14, as illustrated in FIGS. 27–29. However, the coil 112 may be separately energized by a varying direct or an alternating current which is so related to the magnitude of the current in the arc 14 that substantially uniform heating of the edge surfaces of the plates 1 and 2 is obtained.

Another method for compensating for the non-uniform heating effects of an alternating current arc is to employ a square wave current for the current of the arc 14 with current reversals taking place on the end tabs, such as the tabs 6, 7, 10 and 11 or the tabs 30 and 31. Normally, the power lines supply current having a sine wave form, and although various known devices may be used to convert the alternating current of a sine wave form to an alternating current of a square wave form, e.g., a limiting diode circuit in series between the power lines and the arc 14, FIG. 30 illustrates apparatus which not only provides the square wave form current but also provides synchronization of the arc polarity with the movement of the arc 14.

In FIG. 30 a conventional rectifier 115, which preferably is supplied from a three-phase alternating current source because of the magnitude of the currents involved, supplies direct current at its output leads 116 and 117. The lead 116 is connected to the gates 118 and 121 and the lead 117 is connected to the gates 120 and 119 which may, for example, be controllable silicon rectifiers. Gates 118 and 120 are connected to the plate 1 and gates 119 and 121 are connected to the plate 2.

When the gates 120 and 121 are conducting, a square wave voltage of one polarity is supplied to the plates 1 and 2, the gates 118 and 119 being closed. When the gates 118 and 119 are conducting, the gates 120 and 121 are closed, and a square wave of opposite polarity is supplied to the plates 1 and 2. The gates 118–121 are controlled by a control circuit 123 of a conventional type which, in turn, is controlled by the voltages developed across a pair of resistors 124 and 125, the resistor 124 being connected between the tab 7, which is in spaced relation to the plate 2 in the manner described hereinbefore, and the plate 2, and the resistor 125 being connected between the tab 11 and the plate 2. The tab 11 is also spaced from the plate 2 in the manner described hereinbefore and so that the arc 14 can bridge the gap between the plate 2 and the tab 11. Thus, when the arc 14 extends between the tabs 6 and 7, the voltage developed across the resistor 124 causes the control circuit 123 to open the gates 120 and 121 and to close the gates 118 and 119, whereas when the arc 14 is between the tabs 10 and 11, the voltage developed across the resistor 125 causes the control circuit 123 to close the gates 120 and 121 and open the gates 118 and 119. In the operation of the apparatus described hereinafter, it will be assumed that a steady magnetic field extends into the gap between the edges of the plates 1 and 2.

When the apparatus shown in FIG. 30 is originally put into operation, an arc appears between the projections on the tabs 6 and 7 and travels from such tabs to the tabs 10 and 11, where, by reason of the control circuit, the polarity of the arc voltage is reversed causing the arc 14 to travel from the tabs 10 and 11 to the tabs 6 and 7. When the arc 14 reaches the tabs 6 and 7 the control circuit reverses the polarity of the arc voltage thereby causing the arc 14 to again travel from the tabs 6 and 7 to the tabs 10 and 11. Accordingly, as long as the rectifier 115 supplies the direct current voltage to the leads 116 and 117, the arc 14 will move back and forth from one pair of end tabs to the other. The supply of direct current voltage to the leads 116 and 117 is discontinued when the edge surfaces of the plates 1 and 2 have reached the desired temperature.

In the apparatus shown in FIG. 30 it is necessary to control currents of relatively large magnitude and with such currents there are significant losses in converting the alternating current to direct current and in the control of such currents by the gates 118–121. Similar results can be obtained by supplying direct current to the plates 1 and 2 and by reversing the direction of the magnetic field in synchronism with the movement of the arc 14. Only relatively small currents are required to produce the magnetic field.

FIG. 31 illustrates apparatus similar to that shown in FIG. 30 except for the fact that the polarity of the magnetic field rather than the polarity of the arc current is controlled. In the apparatus of FIG. 31, the solenoid 98 of the magnetic field producing means is connected to the gates 118–121 in place of the plates 1 and 2, and the plates 1 and 2 are connected to the arc current source 16 by the leads 23 and 24, the arc current source 16 being a direct current source. The operation of the apparatus shown in FIG. 31 is similar to that described in connection with FIG. 30 in that when the arc 14 is between a pair of tabs it produces a voltage across the corresponding resistor 124 or 125 which operates the control circuit 123 so as to reverse the polarity of the voltage applied to the solenoid 98. In this way, the arc 14 is caused to move back and forth between the end tabs 6 and 7 and 10 and 11 until the source 16 is de-energized or disconnected from the plates 1 and 2, such de-energization or disconnection being performed when the edge surfaces of the plates 1 and 2 have reached the desired temperature.

Instead of employing the voltage developed across a resistor as described in connection with FIG. 30, the presence of the arc 14 between the end tabs may be detected by sensors 130 and 131 as illustrated in FIG. 32. The sensors 130 and 131 may be a known type of optical sensor which is responsive to the presence or absence of light, and they are selected and positioned so as to be responsive to the presence of the arc 14 between the tabs 6 and 7 in the case of the sensor 130 and between the tabs 10 and 11 in the case of the sensor 131. Alternatively, the sensors 130 and 131 may be of another type, such as wire coils which, when the arc 14 moves to adjacent thereto, will generate an electrical pulse as a result of the magnetic field of the arc 14, or such as a thermal sensor which will provide a voltage or resistance charge because of the heat produced by the arc 14 when it is near the thermal sensor. The optical sensors 130 and 131 provide signals to the control circuit 123 in the same manner as the resistors 124 and 125, respectively.

In the previously described embodiment in which the arc 14 has been extinguished after it makes one traverse of the surfaces to be heated, the arc 14 has been extinguished either by virtue of the fact that it has been forced off the end of the run-off tabs, e.g., tabs 10 and 11 or tab 30, or by reason of the spreading apart of the run-off tabs with respect to each other or to the electrode 25. It is also possible to extinguish the arc 14 when it reaches the run-off tabs, such as the tabs 10 and 11, by means of disconnection of the source 16 from the plates 1 and 2 using an optical or other sensor of the type described in connection with FIG. 32. FIG. 33 illustrates the use of the sensor 131 to control, by way of a control circuit 133, a momentary gate or switch 134 connected in series with the lead 23 which is connected to the arc current source 16. Thus, when the arc 14 reaches the tabs 10 and 11, the sensor 131 supplies a signal to the control circuit 133 which closes the gate or switch 134 and thereby disconnects the source from the plates 1 and 2 for a time sufficient to cause the arc 14 to extinguish. Thereafter, the arc 14 is re-started between the projections of the tabs 6 and 7 in the manner described hereinbefore.

As mentioned hereinbefore, the cross-sectional dimensions of the arc 14 may be less than the dimension of one or both surfaces to be heated in a direction perpendicular to the axis of the arc 14 and to its direction of movement. In such case, a comparatively narrow area of the surface or surfaces is heated directly by the arc, and conduction of heat from such area to the remainder of the surface or surfaces must be relied upon to obtain sufficient heating thereof. However, since the area upon which the arc 14 impinges will be hotter, uniformity of heat distribution is not obtained, and the surface area upon which the arc 14 impinges may be overheated. For these reasons, it is desirable to cause the arc 14 to move not only along the length of the surface or surfaces to be heated, but also in a direction transverse thereto when the arc 14 is not of a cross-sectional dimension sufficient to impinge upon the full width of the surface to be heated.

In some cases it is desirable to cause the heating to take place in an inert gas atmosphere, and therefore, an inert gas is caused to flow over the surfaces to be heated. In such event, the gas may be used to cause the arc 14 to move transversely to its normal path. Of course, if an inert gas is not required, air may be used for the same purpose.

FIG. 34 illustrates apparatus for moving the arc 14 in the direction of the vertical or thickness dimension of the edge surfaces of the plates 1 and 2 as the arc 14 is moved along the length of the edge surfaces by the magnetic field 5. As mentioned hereinbefore, the arc 14 is movable by the air convection currents produced during heating and by intentionally directing a gas thereon. In the apparatus shown in FIG. 34, a pair of tubes 140 and 142, each having a longitudinal slot, the slot 142 in the tube 141 being visible, extend above and below the gap between the plates 1 and 2. The tubes 140 and 141 are closed at their ends and are connected by tubing 143 and 144 to a valve 145 driven by an adjustable speed motor 146. The valve 145 alternately connects the tubing 143 and the tubing 144 to a gas source 147, such as a source of air under pressure or, if an inert gas is desired, a source of such gas. Thus, when gas is supplied to the tube 140, a force urging the arc 14 downwardly is applied thereto and when gas is supplied to the tube 141 the gas urges the arc 14 upwardly. Therefore, the arc 14 will move not only in the direction of the arrow M, but also transversely to such direction. In order to avoid having the arc 14 follow the same path each time, preferably, the speed of the motor 146 is adjusted so that the arc 14 moves upwardly and downwardly several times during each traverse of the edge surfaces and at different points along the length of the edge surfaces. In other words, the valve 145 is operated at a frequency which is a non-integral multiple of the frequency at which the arc 14 traverses the edge surfaces.

If the air convection currents are sufficient to move the arc 14 upwardly, the tube 141 may be omitted, and the tube 140 may be used to move the arc 14 downwardly as it reaches its uppermost position. However, such an operation may not be as reliable due to the erratic behavior of the arc 14 in such air currents which themselves are not uniform.

A single tube 140 may be employed without relying on air currents to move the arc 14, if the arc is a direct current arc, by directing a further magnetic field 5a as shown in FIG. 35. In FIG. 35, a magnetic field 5a of the proper polarity with respect to the polarity of the voltage of the arc 14 causes the arc 14 to be constantly urged upwardly but the arc 14 is moved periodically in the downward direction by the gas issuing from the tube 140.

Although the flow of gas in the embodiment shown in FIGS. 34 and 35 is controlled by a valve in the gas line, it will be apparent that the flow of gas may be controlled in other ways, such as by movable shutters between the slots in the tubes 140 and 141 and the gap intermediate the plates 1 and 2.

In the preferred embodiment of the invention, the arc 14 is caused to have two components of movement, one in the direction in which it traverses the length of the surface or surfaces to be heated, and one in a direction transverse to the axis of the arc 14 and its direction of movement, by subjecting the arc 14 to a magnetic field which effectively varies its angle with respect to the axis of the arc 14. Such movement is particularly desirable when the cross-sectional dimension of the arc 14 is smaller than the width dimension of the surface or surfaces to be heated, and such magnetic field may be provided either by subjecting the arc 14 to two differently directed magnetic fields, at least one of which is variable, or by changing the angle of the field from a single source.

Figure 37:
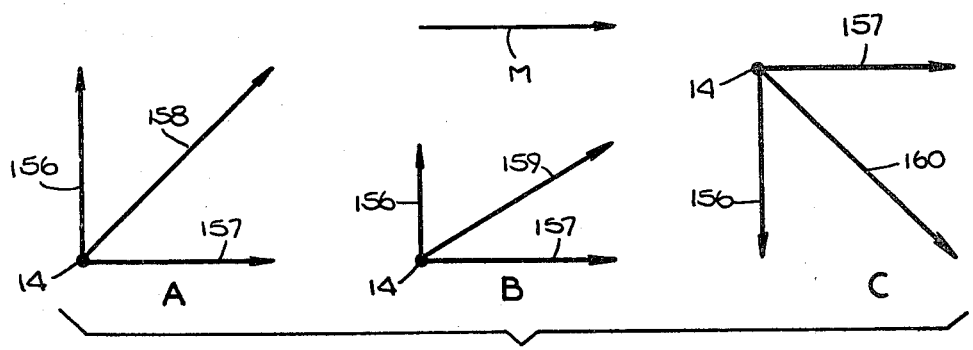

FIGS. 36 and 37 illustrate the basic principles involved when the arc 14 is subjected to two differently directed magnetic fields to cause the desired movement of the arc 14. In FIG. 36, a first core 150 surrounded by a coil 151 connected to a current source 152 provides a vertically directed, first magnetic field 5 which extends into the gap between the ends of the plates 1 and 2, such field 5 corresponding to the field 5 in FIG. 1. A second core 153 surrounded by a coil 154 connected to a current source 155 provides a horizontally directed, second magnetic field 5a which corresponds to the field 5a in FIG. 35. Thus, the first field 5 is perpendicular to the direction of movement M of the arc 14 along the length of the edge surfaces of the plates 1 and 2, and the second field 5a is generally parallel to such direction of movement M in the gap between the edge surfaces. If either field 5 or 5a is maintained constant, the corresponding coil and core may be replaced by permanent magnets which produce the desired field.

Let it first be assumed that within said gap fields 5 and 5a are equal and are polarized so that the forces on the arc 14 are directed as indicated by the vectors 156 and 157 in FIG. 37(a), the vectors 156 and 157 representing, respectively, the forces on the field 5a and 5. The resultant force on the arc 14 has a magnitude and direction indicated by the vector 158, and the arc 14 will move both upwardly (at 45°) and in the direction of the arrow M. Of course, if there is only a field 5, the arc 14 will move only in the direction of the arrow M, and if there is only a field 5a, the arc 14 will move only upwardly. If the field 5 remains constant, the arc current flow is in the same direction and the field 5a decreases, the resultant force, represented by the vector 159 in FIG. 37(b), will be differently directed thereby changing the direction of movement of the arc 14.

If the field 5a reverses polarity, the arc current flow is in the same direction and the field 5 remains constant, the resulting force on the arc 14 is represented by the vector 160 in FIG. 37(c) so that the arc 14 still moves in the direction of the arrow M but at the same time moves downwardly. Therefore, by varying the strength and polarity of the magnetic fields 5 and 5a, the arc 14 can be moved up and down and in the direction of the arrow M or in the reverse direction. The amount of force and its direction are, of course, also dependent on the magnitude of the arc current and its direction of flow.

Accordingly, it will be apparent that by using current sources 152 and 155 of the same or different kinds, but with varying amplitude or phase outputs, the arc 14 can be made to follow various paths on the surface or surfaces to be heated and can be made to follow a different path with each traverse of such surface or surfaces.

For example, let it be assumed that the current in the arc 14 is direct current and the field 5 is constant and of fixed polarity, then by using a source 155 which supplies alternating current to the coil 154 which has a frequency which is a non-integral multiple of the frequency at which the arc 14 traverses the edge surfaces of the plates 1 and 2, paths for the arc 14 like those shown in FIG. 38 can be obtained, the curve 161 representing the path of the arc 14 for one traverse, the curve 162, the next traverse, the curve 163, the next traverse, etc. Of course, the strength of the field 5a should not be sufficient to move the arc 14 off the plates 1 and 2 at the upper or lower surfaces thereof and, preferably, should not be sufficient to cause the arc 14 to travel in the direction of the arrow M adjacent the upper or lower surfaces of the plates 1 and 2 for a time which will overheat the metal adjacent said upper and lower surfaces. Preferably, also, the strength of the field 5a is sufficient to make the arc 14 move to at least near said upper and lower surfaces.

As another example, a pattern similar to that shown in FIG. 38 may be obtained with an alternating current arc 14, with the coil 151 energized from the same source as the arc 14, either by supplying both the arc 14 and the coil 151 from an alternating current source 152 or by connecting the coil 151 in series with the arc circuit (see FIG. 27), and with the current source 155 connected to the supply for the arc current source but modified to include a phase shifter as shown in FIG. 39. In the apparatus shown in FIG. 39, the source 155 supplies to the coil 154 which produces the field 5a a current of the same frequency as the arc current and the current producing the field 5 but variable in phase with respect thereto. The output of the source 155 is varied in phase by a conventional phase shifter 164 driven by an adjustable speed motor 165 which varies such phase out of synchronism with the traverse of the arc 14, so that each time the arc 14 is struck it follows a different path, at least for several traverses of the surfaces to be heated. Of course, after several such traverses, the paths may be repeated in this embodiment as well as in the previously described embodiment.

Figure 40:
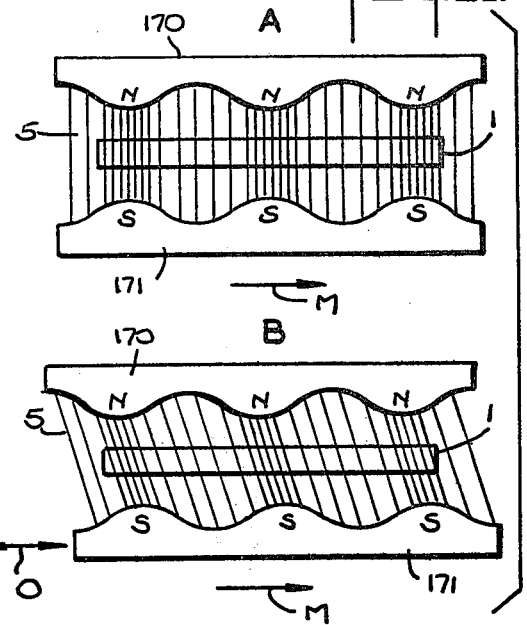

Instead of employing two different magnetic fields, such as the fields 5 and 5a hereinbefore described, a single magnetic field may be periodically modified in direction by various other means to cause the arc 14 to follow different paths during successive traverses of the surface or surfaces to be heated. For example, as shown in FIG. 40, the magnetic field 5 may be provided by a pair of permanent magnets 170 and 171 each of which is shaped to have portions thereof nearer corresponding portions of the other magnet. The result is that, as shown, the field lines 5 extend in a substantially straight line from the portions of the magnet 170 nearer the corresponding portions of the magnet 171, and when the magnets 170 and 171 are in the positions shown in FIG. 40(a), the field lines 5 are substantially vertical. When the magnets are in the positions shown in FIG. 40(a), and the arc voltage is of the proper polarity, the arc 14 is urged in the direction of the arrow M. However, when either magnet 170 or magnet 171 is moved so that their relative positions are as shown in FIG. 40(b), the field lines 5 tilt with respect to the vertical so that the arc 14 is subjected to both a force in the direction of the arrow M and a force upwardly directed as in the cases illustrated in FIGS. 37(a) and (b). Accordingly, if the magnets 170 and 171 are oscillated relative to one another in the directions indicated by the arrow O, the arc 14 may be caused to move up and down as well as in the direction of the arrow M. Preferably, the magnet 170 or the magnet 171, or both of them, is oscillated at a slow rate compared to the rate of traverse of the arc heating the surfaces 14 so that the arc 14 traverses different portions of the surfaces with each traverse.

Instead of employing a pair of shaped permanent magnets 170 and 171 for producing the desired movement of the arc 14, the direction of the magnetic field 5 may be altered by the use of magnetic material movable within the field 5. Thus, as shown in FIG. 41, the magnetic field 5 may be provided by means of a permanent, bar magnet 172 disposed above the plates 1 and 2 so that the field enters into the gap between the plates 1 and 2. A fingered element of magnetic material 173 may be disposed below the lower surface of the plates 1 and 2 in a position to intercept the magnetic field 5 after it passes through such gap. The element 173 is shown in greater detail in FIG. 42, and comprises a base portion 174 interconnecting a plurality of fingers 175. Although the element 173 may merely be made of good permeability material, it may also be made of magnetic material polarized so that the surface thereof nearer the bar magnet 172 has the same polarity as the surface of the bar magnet 172 nearest the element 173.

By oscillating the element 173 in the directions indicated by the arrow O, the field lines 5 may be made to tilt in the manner described in connection with FIG. 40 and the arc 14 will follow a varying path in the manner described hereinbefore.

Instead of a single element 173 and a single bar magnet 172, a pair of bar magnets 172 and 176 and a pair of elements 173 may be disposed as illustrated in FIG. 43. Either or both of the elements 173 may be oscillated in the directions indicated by the arrow O to provide the desired movement of the arc 14 described hereinbefore.

Instead of an element 173, a rotatable element of magnetic material 177 having threads 178 on its surface may be employed to produce the tilting of the magnetic field 5. FIG. 44 illustrates the substitution of such a rotatable element 177 for the element 173 described in connection with FIGS. 41-43. When such rotatable element 177 is rotated, such rotation being accomplished by any conventional drive means, the magnetic field 5 tilts as the helical thread 178 effectively moves parallel to the lower surface of the plate 1. Such rotatable element 177 may also be substituted for both of the elements 173 shown in FIG. 43 with, however, one of the rotatable elements having a thread 178 of a hand opposite to the hand of the thread 178 of the other element 177, or one be rotated at a different speed than the other so that the relative movements of the thread portions are different.

Although the means for causing the arc 14 to traverse the entire area of the surfaces to be heated have been described in connection with the heating of discontinuous, finite length surfaces, such means are also applicable to the heating of continuous, closed surfaces such as the end surfaces of a pair of pipes to be welded together. For example, when the pipe is relatively thick-walled, it is desirable to provide heating throughout the radial thickness thereof, and, in some cases, it is desirable to avoid internal upset which can be minimized by heating the radially outer portions of the end surfaces more than the radially inner portions thereof.

FIG. 45 illustrates the application of the principles of the invention described in connection with FIG. 35 to causing radial movement of the arc 14 as it moves around the axis of the ends of a pair of circular pipes 180 and 181 for the purpose of heating the end surfaces 182 and 183 thereof to welding temperature. The magnetic field 5 for causing movement of the arc 14 around the axes of the pipes 180 and 181 is provided in a conventional manner by means of a pair of electrically energized coils 184 and 185 which are energized so as to produce fields of opposite polarization. As the arc 14 moves around the axis of the pipes 180 and 181 because of the action of the magnetic fields of the coils 184 and 185, the arc 14 is moved radially several times during one traverse of the end surfaces 182 and 183 by means of gas supplied through the tubing 143 and 144 to the chambers 186 and 187 having openings 188 and 189 therein for directing the gas on the arc 14. To provide a random pattern, the chambers 186 are rotated around the axis of the pipes 180 and 181 as the arc 14 moves around such axis but at a rate different from that of the arc 14.

Although it is preferred to employ a pair of coils 184 and 185 for providing the magnetic fields which cause the arc 14 to be moved around the axes of the pipes 180 and 181, one of the coils, either 184 or 185, may be omitted, particularly in the event that one of the pipe sections is relatively short. Of course, other magnetic field producing means of the type hereinbefore described may be employed to produce the magnetic field in the gap between the end surfaces 182 and 183 for the purpose of causing the arc 14 to move around the axes of the pipes 180 and 181.

The application of the principles described in connection with FIG. 36 to the heating of the ends of the pair of pipes is illustrated in FIG. 46. As shown in FIG. 46, the coil 184 produces the field 5 for causing movement of the arc 14 around the axis of the pipes and a second core and coil 190 is mounted within the pipes so as to provide magnetic field lines 5a which cause the arc 14 to move radially inwardly and outwardly on the end surfaces 182 and 183 of the pipes 180 and 181. Thus, as described in connection with FIG. 36, the core and coil 190 may be energized by an alternating current which may have any desired wave shape for the purpose of causing the arc 14 to follow paths on the end surfaces 182 and 183 similar to those illustrated in FIG. 38.

As mentioned hereinbefore, it is sometimes desirable to either heat the end surfaces 182 and 183 at the portions thereof radially outwardly more than the portions thereof radially inwardly so as to reduce the upset during welding at the interior of the pipes 180 and 181. For this purpose, the core and coil 190 may be energized so that the arc 14 remains nearer the outer surfaces of the pipes 180 and 181 longer than it impinges upon portions of the end surfaces 182 and 183 nearer the inner surfaces of the pipes 180 and 181. FIG. 47 illustrates a path 191 at the end surface 182 which the arc 14 may be caused to follow during the time that it makes one traverse of the end 182. By making the frequency of the current supplied to the core and coil 190 asynchronous with the movement of the arc 14 around the axes of the pipes 180 and 181, the path which the arc 14 follows on the end surface 182, and hence, on the end surface 183, is different for each of the traverses of the arc 14.

FIG. 48 illustrates the application of the principles described in connection with FIG. 40 to causing radial movement of the arc 14 as it heats the ends of a pair of pipes 180 and 181. In FIG. 48, a permanent magnet 192 in ring form and shaped as illustrated in FIG. 48, extends around the ends of the pipes 180 and 181 to be heated, and may be mounted either in fixed position or mounted so as to be rotated or oscillated around the axes of the pipes 180 and 181.

A star shaped permanent magnet 193 is mounted so as to be radially disposed with respect to the gap between the ends of the pipes 180 and 181 and if the magnet 192 is mounted so as to rotate or oscillate, the magnet 193 may be held stationary. If the magnet 192 is held stationary or if it is mounted so as to rotate or oscillate, the magnet 193 may be mounted so as to be rotated or oscillated around the axes of the pipes 180 and 181. The movement of the magnet 192 and/or the magnet 193 will produce tilting of the magnetic field lines 5 as described in connection with FIG. 40.

FIG. 49 illustrates the principles described in connection with FIGS. 41-43 to causing the arc 14 to be both radially and circumferentially moved around the axes of a pair of pipes 180 and 181 to be welded. In FIG. 49, a ring shaped permanent magnet 194 extends around the ends of the pipes 180 and 181 so as to provide radially directed field 5 in the gap between the ends of the pipes 180 and 181. A plurality of fingers 195 of magnetic material extend into the space between the inner surfaces of the magnet 194 and the gap between the ends of the pipes 180 and 181, and a rotor 196 is rotatably mounted so as to be disposed radially inwardly of the gap between the ends of the pipes 180 and 181. By rotating or oscillating the rotor 196 and by rotating or oscillating the fingers 195 around the axes of the pipes 180 and 181, the magnetic field lines 5 may be tilted as described in connection with FIGS. 41-43, thereby causing the arc 14 to have both radial and circumferential movement. If less tilting of the magnetic field lines 5 is permissible either the fingers 195 or the rotor 196 may be omitted.

FIG. 50 illustrates the application of the principles described in connection with FIG. 44 to producing both radial and circumferential movement of the arc 14 during the heating of the ends of a pair of pipes 180 and 181. In FIG. 50, the magnetic field lines 5 may be produced in any of the manners described hereinbefore and are caused to tilt by means of a field distorting element 197 which comprises a plurality of teeth 198 of magnetic material extending at an angle with respect to a plane intersecting the axes of the pipes 180 and 181. The element 197 may be either rotated or oscillated around the axis of its shaft 199 or it may be oscillated longitudinally of the axis of the shaft 199 to cause tilting of the magnetic field lines 5 as described in connection with FIG. 44.

If it is possible to rotate the pipes 180 and 181 during the heating thereof, the ends 182 and 183 may be heated by means of the method and apparatus described in connection with FIG. 51. As shown in FIG. 51, a pair of rotatably mounted pipes 180 and 181 are in sliding contact, or in closely spaced relation, at their outer surfaces with the tabs 6 and 7 and are in similar relation at their inner surfaces with tabs 10 and 11 carried by a mandrel 200 which is constructed so that at least a portion of the section 201 thereof, intermediate the tabs 10 and 11, is made of insulating material. As illustrated in FIG. 52, the magnetic field lines 5 extend into the gap between the ends 182 and 183 so as to cause the arc 14 to move radially on the ends 182 and 183, and as the arc 14 moves radially the pipes 180 and 181 are rotated around their axes causing the entire ends 182 and 183 to be heated during one rotation of the pipes 180 and 181. Preferably, the pipes 180 and 181 are heated at a speed and the movement of the arc 14 is at a speed such that the ends 182 and 183 are brought to the desired temperature after several revolutions of the pipes 180 and 181.

FIG. 53 illustrates the use of a single turn coil 202 for the production of the radial magnetic field for causing movement of the arc 14 when it extends between the ends of a pair of pipes 180 and 181. FIG. 53 in effect illustrates the application of the principles described in connection with FIG. 37 for the production of such magnetic field 5. In FIG. 53, the coil 202 which may, for example, be formed of copper tubing which is water cooled, is electrically connected at one end to the pipe 181 and is electrically connected at its opposite end to one terminal of the arc current source 16. The other terminal of the source 16 is connected to the pipe 180, and the coil 202 is, therefore, connected in series with the current circuit for the arc 14.

As described in connection with FIG. 13, a relatively thin plate, requiring less heating, may be heated less than a thicker plate adjacent thereto by causing the arc 14 to move in two directions so that it always has one end on the thicker plate and has its other end on the relatively thin plate part of the time. In FIG. 13, one direction of movement of the arc 14 was caused by the magnetic field and the other direction of movement of the arc 14 was caused by movement of the electrode 45. The methods and apparatus described in connection with FIGS. 34-44 may also be employed to heat a thin plate at the same time as a thicker plate without overheating the thin plate.

FIG. 54, which corresponds to FIG. 13 except that the arc 14 extends from the plate 1 to the plate 2 and to the blocks 76 and 77 as the arc 14 is moved in the directions of the both thickness and length of the plate 1 by the magnetic field or fields, illustrates the heating of both a relatively thick plate 1 and a relatively thin plate 2. The arc 14 is moved along the lengths of the edge surfaces 3 and 4 of the plates 1 and 2 by the magnetic field 5 and is caused to traverse the edge surface 3 of the plate 1 in its thickness direction by any one of the means described in connection with FIGS. 34-44. Accordingly, the arc 14 impinges on the edge surface 4 of the plate 2 less than it does on the edge surface 3 of the plate 1 and impinges on the edge surfaces of the blocks 76 and 77 when it is not impinging on the edge surface 4 of the plate 2.

FIG. 54 may also be considered to illustrate a fragmentary portion of a relatively thick pipe end and a fragmentary portion of a relatively thin pipe end. In such case, the plate 1 represents the relatively thick pipe and the plate 2 represents the relatively thin pipe. The blocks 76 and 77 would represent fragmentary portions of a pair of hollow conductive cylinders.

As mentioned hereinbefore, the heating of the metal parts with the arc 14 may be for the purpose of heat treating, annealing, forge welding or melt welding. Certain aspects of the invention are particularly useful in heating one or more metal parts for hardening or annealing purposes. In the figures illustrating the various embodiments hereinafter described, the illustration of the magnetic field will be omitted for ease in illustration, but it will be apparent that a magnetic field which will produce the desired movement of the arc 14 will be selected and employed in the manner described hereinbefore. In those cases, where the path of the arc 14 is discontinuous, the magnetic field and the arc current may be such that the arc 14 extinguishes at the end of each traverse and is then re-established or may be such that the arc 14 travels back and forth along the surface or surfaces to be heated without being extinguished after each traverse in the manner described hereinbefore.

FIG. 55 illustrates the heating of the ends of a pair of shafts 205 and 206 using the principles described in connection with FIG. 1. In FIG. 55, the arc 14 extends between the end portions of the shaft 205 and 206 and moves in the direction of the axes thereof. As the arc 14 so moves, the shafts 205 and 206 are rotated, such as in the direction of the arrows R, so that the entire peripheries of the shafts 205 and 206 at the ends thereof are heated by the arc 14.

The principles described in connection with FIG. 1 may also be employed for the heating of the ends of the shafts 205 and 206 in the manner illustrated in FIG. 56. In FIG. 56, the arc 14 moves substantially diametrically of the ends of the shafts 205 and 206 as the shafts 205 and 206 are rotated in the direction of the arrows R, such rotation of the shafts 205 and 206 causing the entire end surfaces of the shafts 205 and 206 to be heated by the arc 14.

In the embodiment illustrated in FIG. 56, the central portions of the ends of the shafts 205 and 206 will be heated more than the portions thereof at or near the peripheries of the shafts 205 and 206 if the speed of movement of the arc 14 is uniform. Accordingly, in the preferred embodiment, the magnetic field which causes the arc 14 to move across the ends of the shafts 205 and 206 is varied in intensity or distribution in the direction from the tabs 6 and 7 to the tabs 10 and 11. Thus, the intensity of the magnetic field is less between the portions of the ends of the shafts 205 and 206 nearer the tabs 6 and 7 and the tabs 10 and 11 than it is at the central portions of such ends so that the speed of movement of the arc 14 is slower adjacent the peripheries of the shafts 205 and 206 than it is when the arc 14 impinges upon the central portions of the ends of the shafts 205 and 206.

FIG. 57 illustrates the use of the principles described in connection with FIGS. 2 and 3 for the heating of the end portion of the shaft 205. In the apparatus of FIG. 57, the arc 14 extends between the electrode 25a and the shaft 205 and moves from the tab 31a in the direction of the tab 30a. The tabs 30a and 31a may contact the shaft 205 or may be spaced therefrom by a small amount, as described hereinbefore, so that one end of the arc 14 can jump from the tab 31a to the shaft 205 and from the shaft 205 to the tab 30a. A gap 207 is provided between the electrode 25a and the tab 30a which cannot be bridged by one end of the arc 14, so that when the arc 14 reaches the gap 207 it will extend between the electrode 25a and the tab 30a and will be extinguished at the upper end of the gap 207. However, as mentioned hereinbefore, the arc 14 may be reversed in the direction of movement at the tab 30a rather than extinguished.

As the arc 14 traverses the peripheral surface of the shaft 205 in an axial direction, the shaft 205 is rotated in the direction of the arrow R so as to cause heating of the entire peripheral end portion of the shaft 205.

The shaft 205 has been illustrated in FIG. 57 as having a cylindrical outer surface. If the outer surface is irregular, e.g., has an arcuate protrusion thereon, the surface of the electrode 25a nearest the periphery of the shaft 205 may be correspondingly shaped so as to provide the desired spacing between the electrode 25a and the peripheral surface of the shaft 205. Also, the end of the shaft 205 may be otherwise shaped or formed and the electrode 25a may be shaped to conform to the shape of the shaft end.

FIG. 58 illustrates the application of the principles described in connection with FIGS. 2 and 3 to the heating of the ends of the shafts 205 and 206. Thus, FIG. 58 illustrates an electrode 25 disposed between the ends of the shafts 205 and 206 and a pair of arcs 14 extending between such electrode 25 and the ends of the shafts 205 and 206. The arcs 14 move diametrically of the end surfaces of the shafts 205 and 206, while the shafts 205 and 206 are rotated in the direction of the arrows R.

The arc current source 16 may be connected to the electrode 25 and to the shafts 205 and 206 as illustrated in FIG. 58. However, a pair of arc current sources may be connected to the shafts 205 and 206 and the electrode 25, one source being connected between the electrode 25 and the shaft 205 and the other source being connected between the electrode 25 and the shaft 206. Also, if desired, a single source may supply the current for both of the arcs 14, in which event, the terminals of the source will be connected to the shafts 205 and 206 and the electrode 25 may be "floating", i.e., will not be connected to either terminal of the source except by way of the arcs 14. One advantage of the embodiment shown in FIG. 58 is that the ends of the shafts 205 and 206 may be differently heated using the principles described hereinbefore.

FIG. 59 illustrates the application of the principles described hereinbefore to the heating of the inner surface 208 of a ring 209. In FIG. 59, the electrode 25 is mounted adjacent the inner surface 208 and the arc 14 traverses the inner surface 208 in the direction of the axis of the ring 209. If it is desired to heat the entire inner surface 208, the ring 209 is rotated around its axis as the arc 14 traverses the surface 208. However, if it is desired to heat only axially extending portions of the surface 208 which are circumferentially displaced, the ring 209 may be maintained stationary for one or more traverses of the arc 14 and may then be rotated around its axis by the desired amount so as to permit the arc 14 to again traverse the surface 208 at a portion thereof spaced circumferentially from the previously heated portion thereof. In other words, the ring 209 is intermittently rotated around its axis so as to produce a plurality of axially extending, circumferentially spaced, heated portions which may, for example, be subsequently hardened in a conventional manner to provide wear tracks at the inner surface of the ring 209.

FIG. 60 illustrates the application of the principles described in connection with FIGS. 4 and 5 to the heating of the peripheral surface of a rod 210. As shown in FIG. 60, a ring electrode 211 extends around and is in spaced relation to the rod 210 and the arc 14 extends between the electrode 211 and the peripheral surface of the rod 210. The arc 14 is caused to move around the axis of the rod 210 by an axially extending magnetic field in the manner described hereinbefore. During such movement of the arc 14, the electrode 211 may be moved axially of the rod 210, as indicated by the arrow S, to cause an axially extending portion of the surface of the rod 210 to be heated. Preferably, a disc 212, which may, for example, be a water cooled disc of conductive material, may be placed in contact with or close to the end of the rod 210 to serve as a run-off tab for the purposes described hereinbefore.

Instead of moving the electrode 211, the electrode 211 may be held stationary and the rod 210 may be oscillated in the direction of the double-ended arrow S. Furthermore, if it is desired to heat the entire length of the rod 210 for annealing or drawing purposes, the electrode 211 may be held stationary and the rod 210 may be moved in a single axial direction with respect to the electrode 211.

FIG. 61 illustrates the use of the ring electrode 211 for heating the internal surface of a pipe or tube 213 which may have a run-off ring 214 at the end thereof. As the arc 14, which extends between the electrode and the inner surface of the tube 213, moves around the axis of the tube 213, the electrode 211 or the tube 213 may be oscillated in the direction of the double-ended arrow S.

FIG. 62 illustrates a modification of the apparatus shown in FIG. 60 in which the ring electrode 211 extends in a plane which is at less than a right-angle to the axis of the rod 210. With the apparatus shown in FIG. 62 it is not necessary to oscillate either the electrode 211 or the rod 210, and the rod 210 may be merely rotated in its axis to provide heating of the surface end portion of the rod 210.

FIG. 63 illustrates a further embodiment of the invention for heating the end portion of the shaft 205 or the rod 210. In FIG. 63, a spiral electrode 25b extends around the end portion of the shaft 205 which it is desired to heat. The arc 14 is struck between the upper end 215 of the electrode 25b and a tab 217 which corresponds to the tab 6 previously described. The arc 14 then moves along the inner surface of the electrode 25b and between such inner surface and the shaft 205 until it reaches the lower end 216 of the electrode 25b at which point it may be extinguished or caused to reverse its direction of motion and return to between the upper end 215 and the tab 217. As the arc 14 so moves the shaft 205 is rotated so that the entire surface of the portion of the shaft 205 intermediate the ends 215 and 216 of the electrode 25b is heated.

In the various embodiments described, the arc 14 may be surrounded by air or by another gas such as argon. When the parts to be heated are electrically isolated, e.g., insulated from each other or connected only by a relatively high impedance or resistance, direct current or low frequency alternating current may be employed for the arc 14. However, if the parts are electrically connected, e.g., as shown in FIG. 20, alternating current of a frequency sufficiently high to increase the impedance between the parts to a value sufficient to produce the arc 14 between the parts should be employed. The embodiments in which the arc 14 extends between a pair of parts to be heated, rather than between an electrode and the parts, are preferred when it is possible to use them because of the improved efficiency.

Although preferred embodiments of the present invention have been illustrated and described, it will be apparent to those skilled in the art that various modifications may be made without departing from the principles of the invention.

What is claimed is:

1. In apparatus for electrically heating a first metal part along a path of finite length on a surface of said part and having opposite ends and a second metal part along a path of finite length on a surface of said second part and having opposite ends, by means of an electric arc extending in the length direction thereof, between said surface of said first metal part and said surface of said second metal part, said surface of said second metal part extending for the length of and adjacent but in spaced relation to said surface of said first metal part and said first part and said second part being in stationary relation to each other, one end of said arc impinging on, without melting, said surface of said first metal part and the opposite end impinging on, without melting, said surface of said second metal part, said apparatus including arc current means having terminals at different potentials, one connected to said first part and another connected to said second part for sustaining said arc, the combination therewith of magnetic field means for producing a magnetic field in the space between said part and said member and extending transversely to the length of said arc and the length of said path, and for thereby causing the ends of said arc to traverse each said part along each said path, and first electrically conductive, run-off tab means at at least one of said ends of said path on said first part and coupled to said first part and second electrically conductive tab means at at least one end of the path on said second part and coupled to said second part for the transfer of said arc from the path on each part to said tab means, said first tab means being adjacent to but spaced from said second part, whereby at one end of each said path, at least one end of said arc impinges on one of said tab means, said magnetic field means also including means for producing a magnetic field extending transversely to the length of said arc in the positions thereof in which it impinges on said tab means, for causing said end of said arc to transverse at least part of said tab means.

2. Apparatus as set forth in claim 1 wherein said conductive member is an electrode which extends adjacent to and is spaced from said metal part and said tab means.

3. Apparatus as set forth in claim 2 further comprising a further metal part in contact with first-mentioned metal part adjacent said path, whereby said end of said arc also impinges on said further metal part.

4. Apparatus as set forth in claim 2 wherein said metal part is disposed at one side of said electrode and further comprising a further metal part disposed at the opposite side of said electrode and spaced from both said electrode and said first-mentioned metal part, said further metal part being connected to a terminal of said source at a potential different from the terminal to which said conductive member is connected for sustaining said arc between said member and said further metal part, wherein said magnetic field means produces a magnetic field extending transversely to the length of said arc as it extends between said member and said further metal part for causing said end of said arc to traverse said further metal part along a further path on the surface of said further part corresponding to the portion of said further part to be heated, said further path also having opposite ends and wherein said tab means is at both ends of said further path and said first-mentioned path and is coupled to both said further metal part and said first-mentioned metal part for the transfer of said arc from said further metal part and said first-mentioned metal part to said tab means, whereby said end of said arc traverses one said path, traverses a tab means at an end of said one path, traverses the other said path, traverses the tab means at the opposite end of said one path and then again traverses said one path.

5. Apparatus as set forth in claim 4 wherein said electrode is mounted for movement in a direction transverse to the length of said arc.

6. Apparatus as set forth in claim 4 further comprising control means connected to said arc current means and responsive to the position of said arc for varying the current in said arc as it moves from one said part to the other said part.

7. Apparatus as set forth in claim 6 wherein said arc current means comprises a control for controlling the magnitude of the current in said arc, said tab means is spaced from said first-mentioned part and said further part and said control means comprises a control switch coupled to said tab means and responsive to current flow between said tab means and said first-mentioned part and said further part, said switch being connected to said control of said arc current means.

8. Apparatus as set forth in claim 4 further comprising control means connected to said magnetic field means and responsive to the position of said arc for varying the strength of said magnetic field as said arc moves from one said part to the other said part.

9. Apparatus as set forth in claim 8 wherein said magnetic field means comprises a field strength control for varying the strength of the magnetic field, said tab means is spaced from said first-mentioned part and said further part and said control means comprises a control switch coupled to said tab means and responsive to current flow between said tab means and said first-mentioned part and said further part, said switch being connected to said field strength control.

10. Apparatus as set forth in claim 4 wherein said tab means is spaced from said first-mentioned part and said further part, and further comprising resistive means connecting said one terminal of said arc current source to one of said parts.

11. Apparatus as set forth in claim 1, wherein said tab means comprises four tabs, a first one of said tabs being coupled to said first metal part at said one end of said path thereon, a second one of said tabs being coupled to said second metal part at the end thereof adjacent to said one end of said path on said first part and being in spaced relation to said first one of said tabs, a third one of said tabs being coupled to said first metal part at the opposite end of said path thereon, and a fourth one of said tabs being coupled to said second metal part at the opposite end of said path on said second part and being in spaced relation to said third one of said tabs.

12. Apparatus as set forth in claim 11 wherein said first and third tabs are in contact with said first metal part and said second and fourth tabs are in contact with said second metal part.

13. In apparatus for electrically heating a first metal part along a path of finite length on a surface of said part and having opposite ends, by means of an electric arc extending in the length direction thereof, between said metal part and a second metal part which is to be heated, said second metal part being spaced from said first metal part with one end of said arc impinging on said first metal part and the opposite end of said arc impinging on said second metal part and traversing a further path on the latter corresponding to the portion of said second part to be heated, said further path having opposite ends respectively adjacent said opposite ends of said first-mentioned path, said apparatus including a direct current source having terminals at different potentials, one connected to said first part and another connected to said second part for sustaining said arc, the combination therewith of magnetic field means for producing a constant magnetic field in the space between said first part and said second part and extending transversely to the length of said arc and the length of said path, and for thereby causing the ends of said arc to traverse each said part along each said path, electrically conductive, run-off tab means comprising four tabs, a first one of said tabs being coupled to said first metal part at one end of said path thereon, a second one of said tabs being coupled to said second metal part at the end thereof adjacent to said one end of said first-mentioned path and being in spaced relation to said first one of said tabs, a third one of said tabs being coupled to said first metal part at the opposite end of said path thereon, and a fourth one of said tabs being coupled to said second metal part at the opposite end of said further path and being in spaced relation to said third one of said tabs for the transfer of said arc from each said path to said tab means, whereby at each one of the ends of the paths, said arc impinges on said tab means, said magnetic field means also including means for producing a magnetic field extending transversely to the length of said arc in the positions thereof in which it impinges on said tab means, for causing said end of said arc to traverse at least part of said tab means, and arc starting means connected between said first tab and said second tab for initiating an arc between said first tab and said second tab.

14. Apparatus as set forth in claim 13 wherein the spacing between said third tab and said fourth tab increases in the direction of movement of said arc to a value such that the potential of said arc current means is insufficient to sustain said arc.

15. Apparatus as set forth in claim 13 wherein said arc starting means provides a voltage sufficient to initiate an arc whenever a previously initiated arc is extinguished.

16. Apparatus as set forth in claim 15 wherein each of said first tab and said second tab has a sharp-pointed projection thereon, the sharp-pointed projection of said first tab being nearer the sharp-pointed projection of said second tab than the remainder of said first tab is to the remainder of said second tab for causing said arc to be initiated between said projection on said first tab and said projection on said second tab.

17. Apparatus as set forth in claim 13 wherein said magnetic field means comprises means for producing a magnetic field between said third tab and said fourth tab having a strength greater than the strength of the magnetic field between said first-mentioned metal part and said further metal part.

18. In apparatus for electrically heating a metal part along a path of finite length on a surface of said part and having opposite ends, by means of an electric arc extending in the length direction thereof, between said metal part and an electrically conductive member which extends for the length of and adjacent but is in spaced relation to said surface and is in stationary relation to said part, one end of said arc impinging on said metal part and the other end of said arc impinging on, but not melting, said member, said apparatus including arc current means having terminals at different potentials, one connected to said part and another connected to said member for sustaining said arc, the combination therewith of magnetic field means for producing a magnetic field in the space between said part and said member and extending transversely to the length of said arc and the length of said path, and for thereby causing said end of said arc to traverse said part along said path, and electrically conductive, run-off tab means at both ends of said path and coupled to said part for the transfer of said arc from said path to said tab means, said tab means being adjacent to but spaced from said conductive member, whereby at said one end of said path, said one end of said arc impinges on said tab means, said magnetic field means also including means for producing a magnetic field extending transversely to the length of said arc in the positions thereof in which it impinges on said tab means, for causing said end of said arc to traverse at least part of said tab means, said tab means having means for initiating said arc between said conductive member and said tab means and said one terminal being connected to said tab means at one end of said path.

19. Apparatus as set forth in claim 1 wherein said arc current means comprises a direct current source supplying direct current to said terminals.

20. Apparatus as set forth in claim 19 wherein said magnetic field means comprises means for producing a static magnetic field.

21. Apparatus as set forth in claim 20 further comprising control means connected to said source for reversing the polarity thereof and arc responsive means disposed at opposite ends of said path and connected to said control means for reversing the polarity of said source when said arc is adjacent an end of said path.

22. Apparatus as set forth in claim 20 wherein said magnetic field means comprises control means for reversing the polarity thereof and arc responsive means disposed at opposite ends of said path and connected to said control means for reversing the polarity of said magnetic field when said arc is adjacent an end of said path.

23. Apparatus as set forth in claim 19 wherein said magnetic field means comprises means for producing a variable magnetic field.

24. Apparatus as set forth in claim 23 wherein said magnetic field means is of a strength which causes said arc to traverse said path in a predetermined time, and said means for producing a variable magnetic field produces a varying polarity magnetic field having a period twice said predetermined time.

25. Apparatus as set forth in claim 1 wherein said arc current means comprises an alternating current source supplying alternating current to said terminals.

26. Apparatus as set forth in claim 25 wherein said magnetic field means is of a strength which causes said arc to traverse said path in a predetermined time and the period of said alternating current is smaller than said predetermined time.

27. Apparatus as set forth in claim 25 wherein said magnetic field means is of a strength which causes said arc to traverse said path in a predetermined time and the period of said alternating current is twice said predetermined time.

28. Apparatus as set forth in claim 1 wherein said magnetic field means comprises at least a partial loop of a conductor disposed adjacent the space between said part and said conductive member, said conductor being connected electrically in series between one of said terminals and one of said part and said conductive member.

29. Apparatus as set forth in claim 1 further comprising interrupting means connected to said arc current means for interrupting the supply of current to said arc and and arc responsive means disposed adjacent at least one end of said path and connected to said interrupting means for interrupting said current when said arc is adjacent said one end of said path.

30. Apparatus as set forth in claim 1 further comprising means for applying a force to said arc directed transversely to the force applied thereto by said magnetic field means whereby said path may be varied.

31. Apparatus as set forth in claim 30 wherein said means for applying a force comprises means for directing a gas at a pressure above atmospheric pressure on said arc.

32. Apparatus as set forth in claim 30 wherein said means for applying a force comprises further magnetic field means for producing a further magnetic field in said space between said first part and said second part and extending transversely to said field produced by said first-mentioned magnetic field means.

33. Apparatus as set forth in claim 32 wherein said further magnetic field means comprises means for producing a magnetic field of varying magnetic strength.

34. Apparatus as set forth in claim 32 wherein said arc current means comprises an alternating current source supplying alternating current to said terminals, said first-mentioned magnetic field means comprises means for producing a field of alternating polarity, and said further magnetic field means comprises means for producing a field of alternating polarity and variable phase.

35. Apparatus as set forth in claim 30 wherein said means for applying a force comprises magnetic means movably mounted in the field of said magnetic field means, said magnetic means being discontinuous in the direction of the length of said path for causing said field to be non-uniform and for varying the direction of said field as said magnetic means is moved.

36. Apparatus as set forth in claim 35 wherein said magnetic means comprises an element of magnetic material having a plurality of fingers extending transversely to the direction of said field.

37. Apparatus as set forth in claim 35 wherein said magnetic means comprises a rotably mounted member having a helical projection of magnetic material on the peripheral surface thereof extending around the axis of rotation of said member.

38. Apparatus as set forth in claim 1 wherein said first part and said second part are a pair of rotatably mounted tubes with the end of one tube facing the end of the other tube, said tubes being rotatable about a common longitudinal axis and said arc extending between said ends.

39. Apparatus as set forth in claim 1 wherein said surface of said first part is cylindrical, said second part has a cylindrical surface, said first part and said second part are mounted for rotation around their cylinder axes with the cylindrical surface of said first part adjacent but spaced from the cylindrical surface of said second part, said arc extending between the cylindrical surface of said first part and the cylindrical surface of said second part.

40. Apparatus as set forth in claim 1 wherein said first part and said second part are cylindrical, said first part and said second part are rotatable around their cylinder axes with their ends adjacent to but spaced from each other, said arc extending between said ends.

41. Apparatus as set forth in claim 1 wherein said first part is cylindrical and is rotatable around its cylinder axis and said second part is adjacent but spaced from an end of said part and extending diametrically of said end of said part, said arc extending between said second part and said end of said part.

42. Apparatus as set forth in claim 41 further comprising a further rotatable, cylindrical part mounted with an end thereof adjacent but spaced from said second part and from said first part, said arc extending between said second part and both the end of said first-mentioned part and the end of said further part.

43. Apparatus as set forth in claim 1 wherein said first part is a rotatable member with a cylindrical surface and said second part is adjacent but spaced from said surface of said rotatable member and extending axially of the latter.

44. Apparatus as set forth in claim 1 wherein said first part is a rotatable ring having inner and outer surfaces extending around the axis of rotation of said ring and wherein said second part is adjacent but spaced from said inner surface and extending axially of said ring.

45. Apparatus as set forth in claim 1 wherein said first part is a rotatable member having a cylindrical outer surface and wherein said second part extends helically around and is spaced from a portion of said outer surface.

46. Apparatus as set forth in claim 1 wherein said conductive member is an electrode and further comprising a further part to be heated disposed with a surface thereof adjacent but spaced from said electrode and spaced from said surface of said first-mentioned part, said surface of said further part having a dimension different from a dimension of said surface of said first-mentioned part.

47. Apparatus as set forth in claim 46 wherein said surface of said further part has a dimension in a direction transverse to the direction of movement of said arc which is less than the dimension of said surface of said first-mentioned part in said first-mentioned direction and wherein said electrode is movable in said first-mentioned direction and further comprising electrically conductive means at at least one side of said surface of said further part and at the electrical potential of said further part for receiving an end of said arc during a portion of the movement thereof.

48. Apparatus as set forth in claim 1 wherein said surface of said second part has a dimension in a direction transverse to the direction of movement of said arc which is less than the dimension of said surface of said first part in said first-mentioned direction and further comprising electrically conductive means at at least one side of said surface of said second part and at the electrical potential of said second part for receiving an end of said arc during a portion of the movement thereof and means for moving said arc in said first-mentioned direction.

49. A method of heating to welding temperature each of a pair of metal parts along a surface thereon of finite length and having opposite spaced ends by means of an electric arc extending between said surface of one metal part and said surface of the other metal part, the surfaces being adjacent but spaced from each other, said method comprising maintaining the parts in stationary relation to each other, initiating an electric arc between the surfaces, magnetically deflecting said arc, by means of a magnetic field, along said surface of each part from one end to the other thereof with one end of said arc traversing said surface of one part and the other end of the arc traversing said surface of the other part without melting either part, and then, magnetically deflecting one end of said arc on to a conductive tab member at said other end of said surface of said one part and spaced from said other part, repeatedly magnetically deflecting said arc along said surface of each part after said end of said arc impinges on said conductive tab member until the surface of each part reaches welding temperature and then, pressing the surfaces together.

50. A method as set forth in claim 49 comprising extinguishing said arc after said end thereof impinges on said conductive tab member and re-initiating said arc at said one end of said surface before repeating the magnetic deflection of said arc along said surface.

51. A method as set forth in claim 49 comprising extinguishing said arc after said end thereof impinges on said conductive tab member and re-initiating said arc at said one end of said surface of each part before repeating the magnetic deflection of said arc along each said surface.

52. A method as set forth in claim 49 comprising reversing the direction of deflection of said arc after it impinges on said conductive tab member.

53. A method as set forth in claim 52 wherein the direction of deflection of said arc is reversed by reversing the polarity of the magnetic field.

54. Method as set forth in claim 52 wherein the direction of deflection of said arc is reversed by reversing the direction of the arc current.

55. A method of heating a first metal part along a surface of finite length and having opposite spaced ends by means of an electric arc extending between said surface and a second metal part to be heated along a surface of finite length and having opposite ends, the surface of said second metal part being adjacent but spaced from said surface of said first metal part, a first conductive member at one end of said surface of said first metal part, a second conductive member at the corresponding end of said surface of said second metal part and spaced from said first conductive member, a third conductive member at the opposite end of said surface of said first metal part and a fourth conductive member at the opposite end of said surface of said second metal part and spaced from said third conductive member, said method comprising initiating an electric arc between said first and second conductive members, magnetically deflecting said arc by means of a magnetic field, along said surface from one end to the other thereof with one end of said arc traversing said surface of said first metal part and the opposite end of said arc traversing said surface of said second metal part, and then magnetically deflecting the ends of said arc on to said third and fourth members at the opposite ends of the said surfaces, and repeatedly magnetically deflecting said arc along the surfaces after said ends of said arc impinge on said third and fourth conductive members.

56. Method as set forth in claim 49 further comprising deflecting said arc across each said surface in a direction transverse to the direction extending from said one end to said other end of each said surface.

57. Method as set forth in claim 56 wherein said arc is deflected across each said surface as it is deflected along each said surface.

58. Method as set forth in claim 56 wherein said arc is deflected across each said surface by varying the magnetic field applied to said arc.

59. Method as set forth in claim 56 wherein said arc is deflected across said surface by moving said other part.

* * * * *